US009408339B2

(12) United States Patent
Jensen et al.

(10) Patent No.: US 9,408,339 B2
(45) Date of Patent: Aug. 9, 2016

(54) EARTH WORKING APPARATUS

(71) Applicant: Ground Effect, LLC, Thurston, NE (US)

(72) Inventors: Layton Jensen, Thurston, NE (US); Glen W. Sprague, Lincoln, NE (US); Dwayne W. Sovereign, Lincoln, NE (US)

(73) Assignee: Ground Effect, LLC, Thurston, NE (US)

( * ) Notice: Subject to any disclaimer, the term of this patent is extended or adjusted under 35 U.S.C. 154(b) by 0 days.

(21) Appl. No.: 14/277,437

(22) Filed: May 14, 2014

(65) Prior Publication Data

US 2014/0338938 A1 Nov. 20, 2014

Related U.S. Application Data

(60) Provisional application No. 61/824,097, filed on May 16, 2013, provisional application No. 61/937,128, filed on Feb. 7, 2014.

(51) Int. Cl.
*A01B 29/04* (2006.01)
*A01B 27/00* (2006.01)
*A01B 61/04* (2006.01)

(52) U.S. Cl.
CPC ............. *A01B 29/045* (2013.01); *A01B 27/005* (2013.01); *A01B 61/046* (2013.01)

(58) Field of Classification Search
CPC ...... A01B 61/02; A01B 61/04; A01B 61/044; A01B 27/005; A01B 29/045
USPC .................. 172/544, 551, 571, 640, 681, 779
See application file for complete search history.

(56) References Cited

U.S. PATENT DOCUMENTS

| 4,405,019 A | 9/1983 | Frisbee |
| 4,878,544 A | 11/1989 | Barnhart |
| 4,953,625 A | 9/1990 | Hurworth |

(Continued)

FOREIGN PATENT DOCUMENTS

WO WO-99-11875 3/1999

OTHER PUBLICATIONS

Notification of Transmittal of the International Search Report and the Written Opinion of the International Searching Authority—Sep. 26, 2014.

(Continued)

*Primary Examiner* — Gary Hartmann
(74) *Attorney, Agent, or Firm* — Ryan T. Grace; Advent, LLP

(57) ABSTRACT

An earth working apparatus includes a working implement having a first end and a second end. The earth working apparatus also includes a first support supporting the working implement, where the first support also has a first end and a second end. The earth working apparatus further includes a first arm connecting the first end of the working implement to the first end of the first support, and a second arm connecting the second end of the working implement to the second end of the first support. A second support is pivotally coupled with the first support by a torsion coupler. The first arm and the second arm can be pivotally coupled with the first support by a torsion coupler. The second support can be connected to a third support and configured to articulate with respect to the third support between a generally horizontal working orientation and a transport orientation.

3 Claims, 23 Drawing Sheets

(56) References Cited

U.S. PATENT DOCUMENTS

| | | | |
|---|---|---|---|
| 5,211,247 A | | 5/1993 | Johnsen |
| 6,032,746 A | * | 3/2000 | Lowery ........................ 172/445.1 |
| 6,102,132 A | * | 8/2000 | Schimke ........................ 172/498 |
| 6,125,559 A | * | 10/2000 | Mullenhour ..................... 37/232 |
| 6,171,020 B1 | | 1/2001 | Pikna et al. |
| 6,219,943 B1 | * | 4/2001 | Kitchell ........................... 37/232 |
| 6,354,025 B1 | * | 3/2002 | Kirchell ........................... 37/232 |
| 6,536,141 B2 | * | 3/2003 | Kitchell ........................... 37/232 |
| 2006/0249293 A1 | | 11/2006 | Christian |
| 2014/0251646 A1 | * | 9/2014 | Gray et al. ......................... 172/1 |
| 2014/0338936 A1 | * | 11/2014 | Jensen et al. .................. 172/239 |

OTHER PUBLICATIONS www.dirtdogmfg.com.
www.landpride.com.
http://www.abiattachments.com/arena-drag/tr3-rake-arena-groomer/.

* cited by examiner

EARTH WORKING APPARATUS

CROSS-REFERENCE TO RELATED APPLICATIONS

The present application claims the benefit under 35 U.S.C. §119(e) of U.S. Provisional Application Ser. No. 61/824,097, filed May 16, 2013, and titled "DIRT PULVERIZING FINE GRADER" and U.S. Provisional Application Ser. No. 61/937,128, filed Feb. 7, 2014, and titled "EARTH GRADER." U.S. Provisional Application Ser. Nos. 61/824,097 and 61/937,128 are herein incorporated by reference in their entireties.

BACKGROUND

Earth working involves the physical treatment of the earth and includes operations such as beating, compacting, crushing, cultivating, cutting, digging, furrowing, harrowing, leveling, mixing, plowing, pulverizing, rolling, scraping, scratching, smoothing, tilling, and so forth. For example, the earth is worked by an earth working tool driven by a vehicle (e.g., a tractor), and in other cases using hand tools (e.g., a hoe).

SUMMARY

Aspects of the disclosure relate to earth working apparatus. An earth working apparatus (e.g., an earth grader or a sod cutter) includes a working implement (e.g., a dirt pulverizing roller or a blade) having a first end and a second end. The earth working apparatus also includes a first support (e.g., a tube) supporting the working implement, where the first support also has a first end and a second end. The earth working apparatus further includes a first arm (e.g., a first roller hanger or a first blade hanger) connecting the first end of the working implement to the first end of the first support, and a second arm (e.g., a second roller hanger or a second blade hanger) connecting the second end of the working implement to the second end of the first support. A second support (e.g., a tongue) is pivotally coupled with the first support by a torsion coupler. In some embodiments, the first arm and the second arm are also pivotally coupled with the first support by one or more torsion couplers. In some embodiments, the second support is connected to a third support (e.g., a connecting support for connecting the earth working apparatus to a skid steer vehicle or a tractor). The second support is configured to articulate with respect to the third support between a generally horizontal working orientation and a transport orientation (e.g., where the second support is angled away from the working orientation).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures can indicate similar or identical items.

FIG. 1 is an isometric view illustrating an earth working apparatus configured to attach a vehicle, such as a skid steer vehicle, where the earth working apparatus includes a connecting support configured to connect to the vehicle, a tongue extending from the connecting support, and a spike tube pivotally coupled with the tongue by a torsion coupler, and where spikes, a roller, and gauge wheels are attached to the spike tube in accordance with an example embodiment of the present disclosure.

Figure 5:
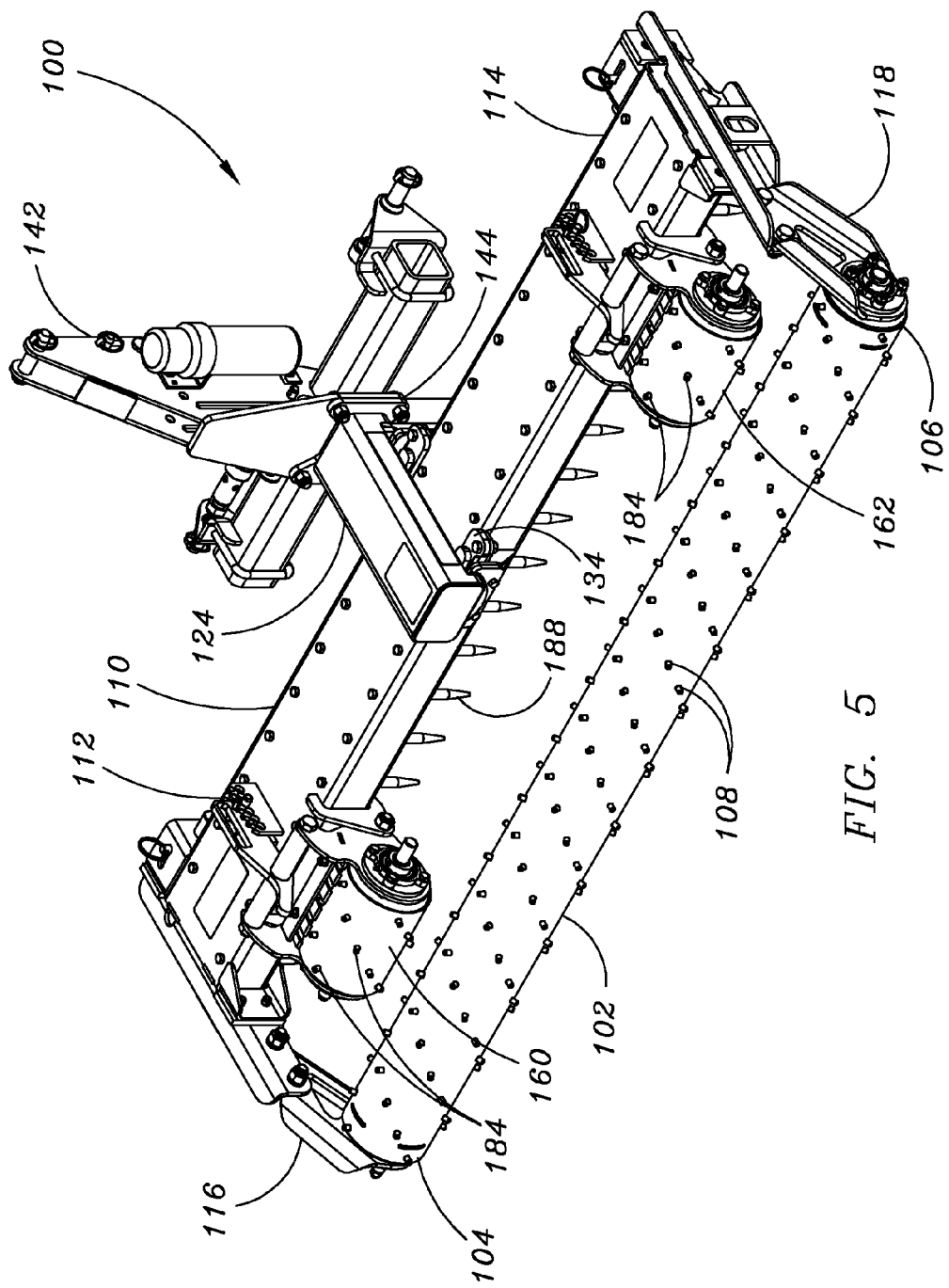

FIG. 5 is an isometric view illustrating an earth working apparatus configured to attach a vehicle, such as a tractor, where the earth working apparatus includes a three-point attachment configured to connect to the tractor, a tongue extending from the three-point attachment, and a spike tube pivotally coupled with the tongue by a torsion coupler, and where spikes, a roller, and gauge wheels are attached to the spike tube in accordance with an example embodiment of the present disclosure.

Figure 6:
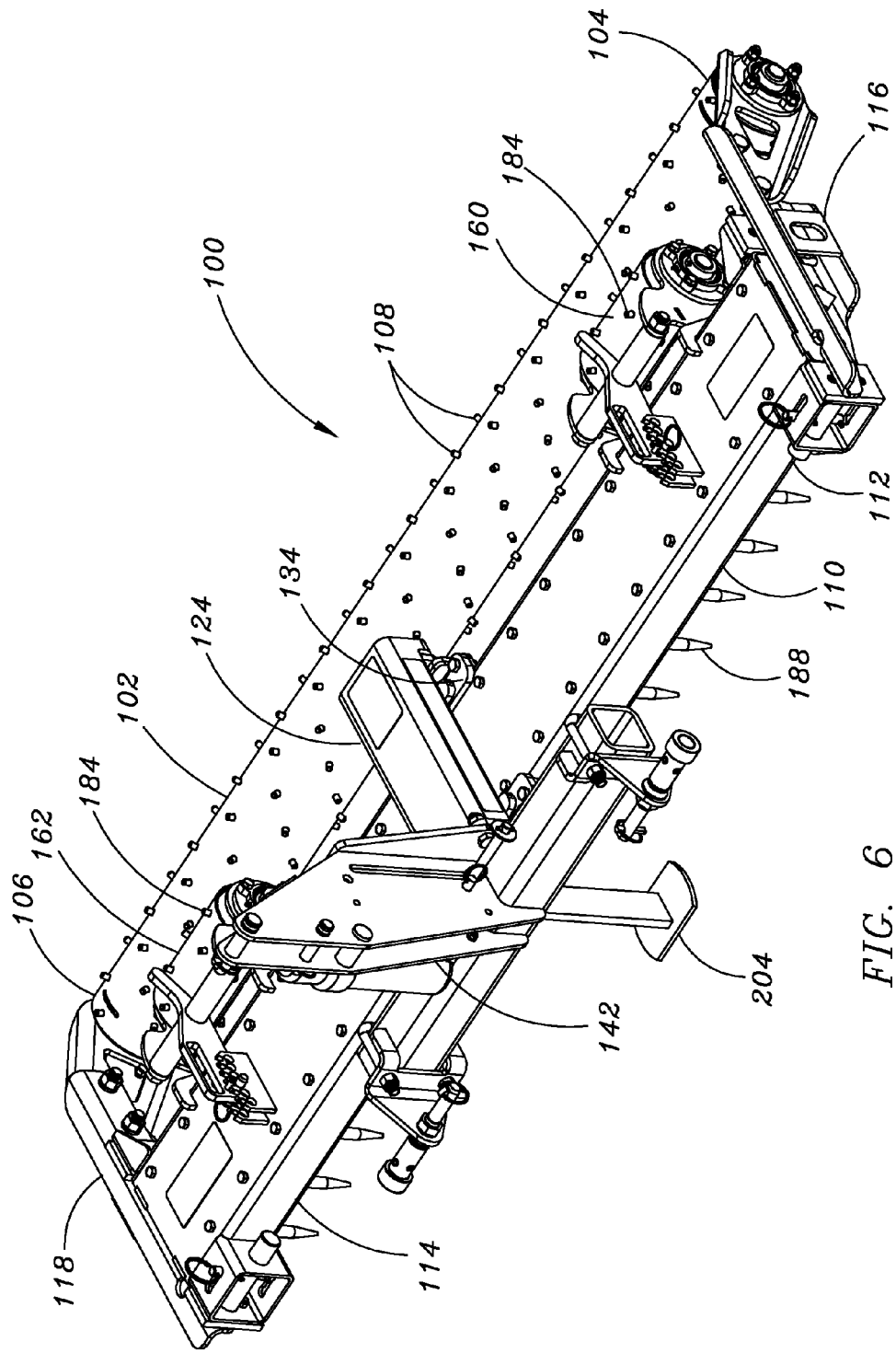

FIG. 6 is another isometric view of the earth working apparatus illustrated in FIG. 5.

Figure 1:
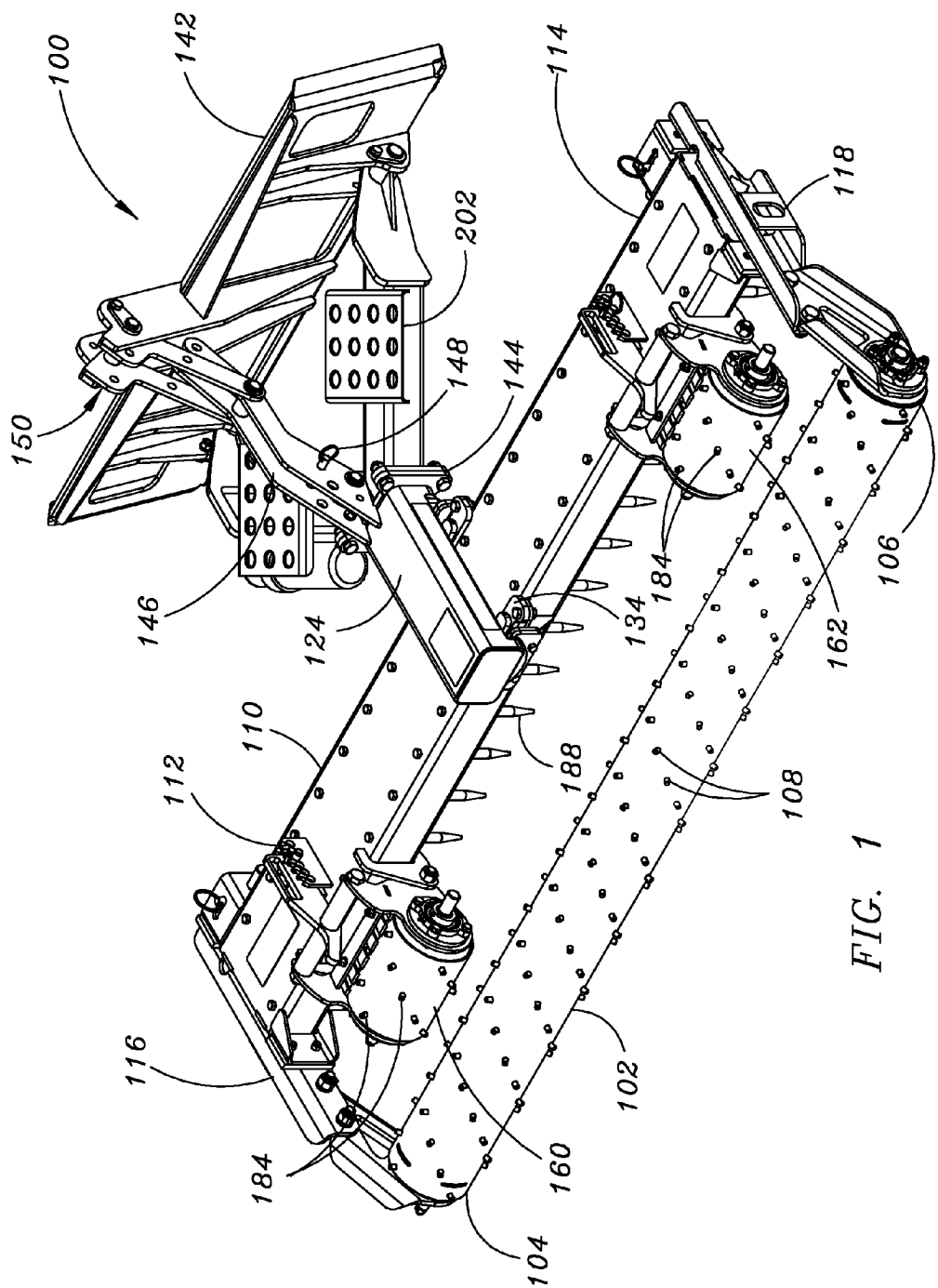
Figure 7:
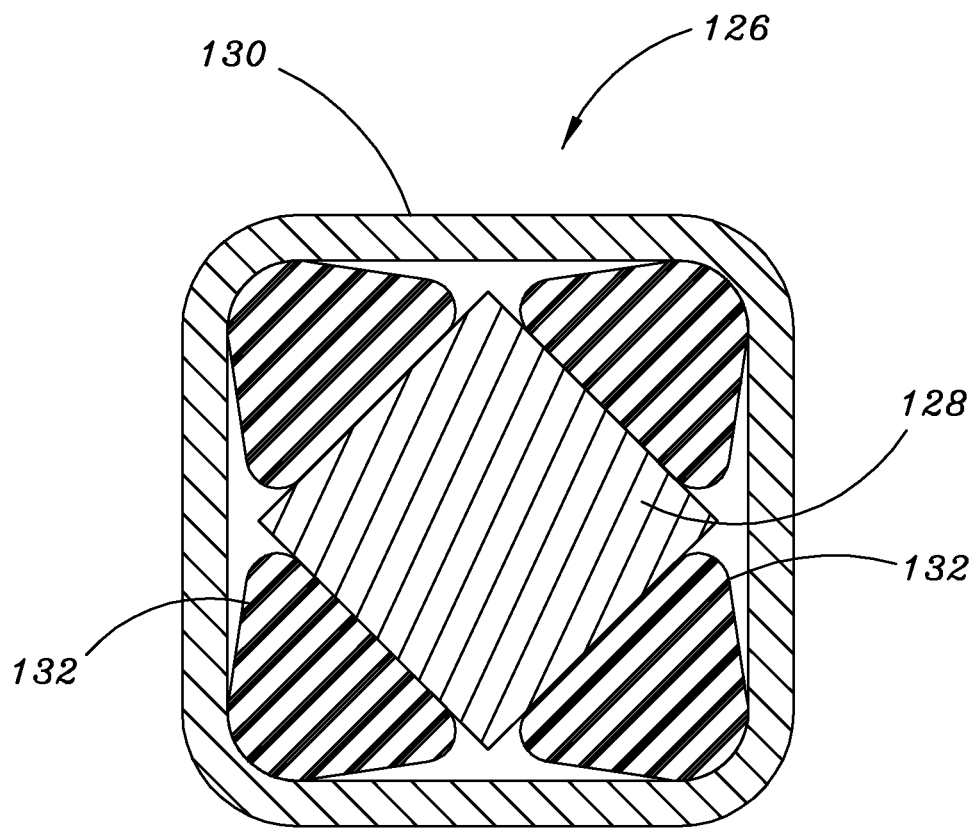

FIG. 7 is a partial cross-sectional side elevation view illustrating a torsion coupler for an earth working apparatus, such as the earth working apparatus illustrated in FIGS. 1 and 5, in accordance with an example embodiment of the present disclosure.

Figure 8:
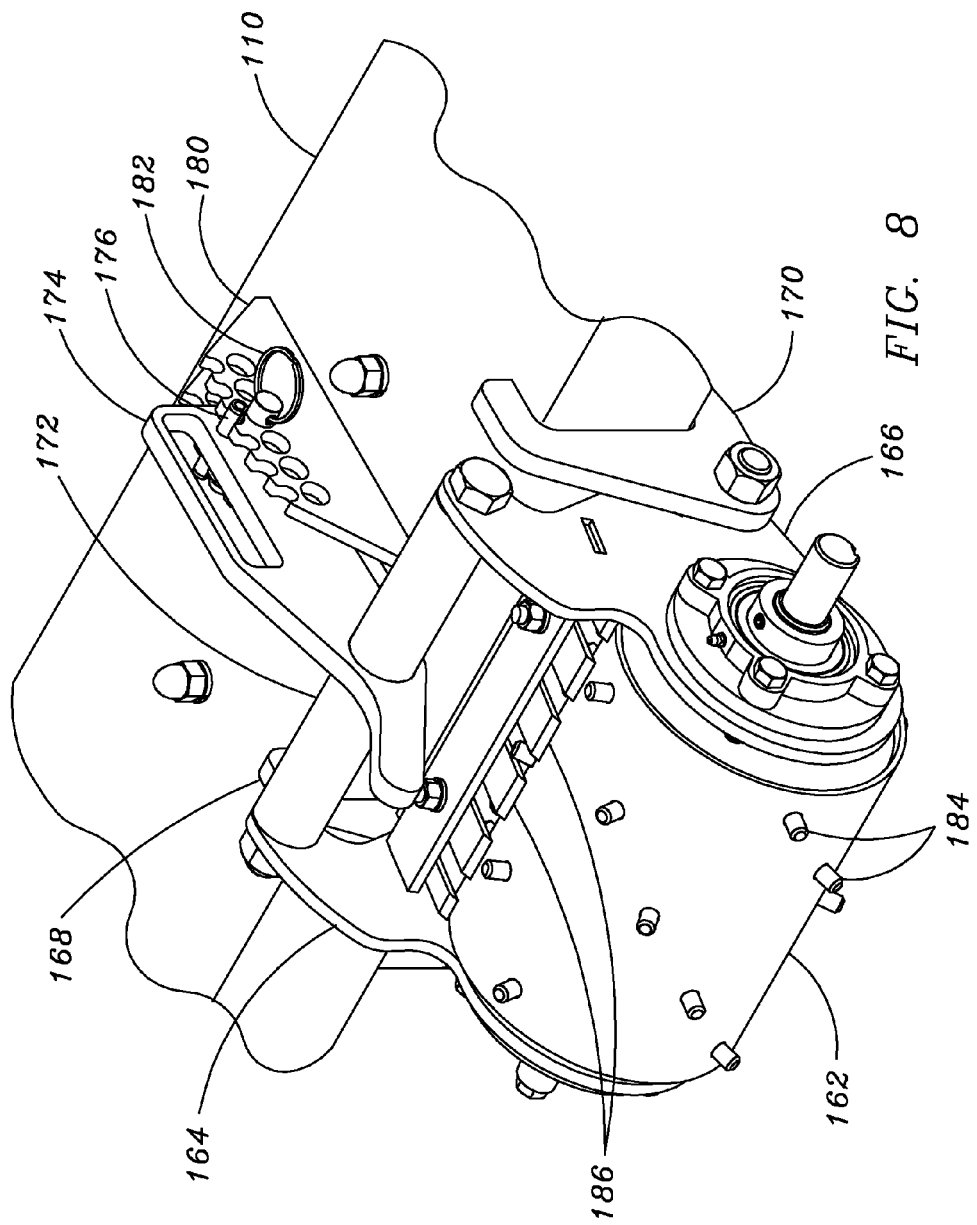

FIG. 8 is an isometric view illustrating a gauge wheel for an earth working apparatus, such as the earth working apparatus illustrated in FIGS. 1 and 5, in accordance with an example embodiment of the present disclosure.

Figure 9:
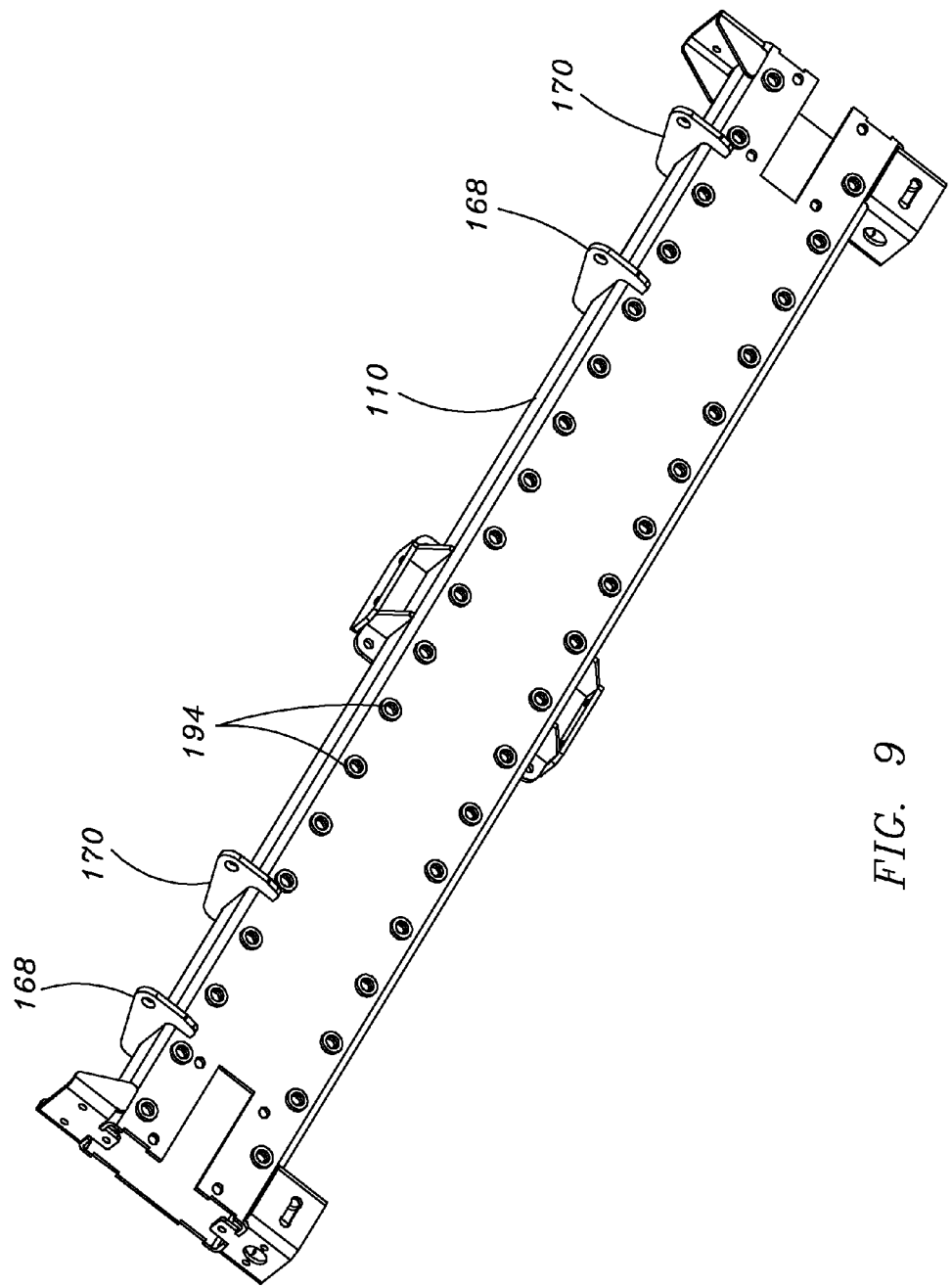

FIG. 9 is a perspective view illustrating a spike tube for an earth working apparatus, such as the earth working apparatus illustrated in FIGS. 1 and 5, in accordance with an example embodiment of the present disclosure.

Figure 10:
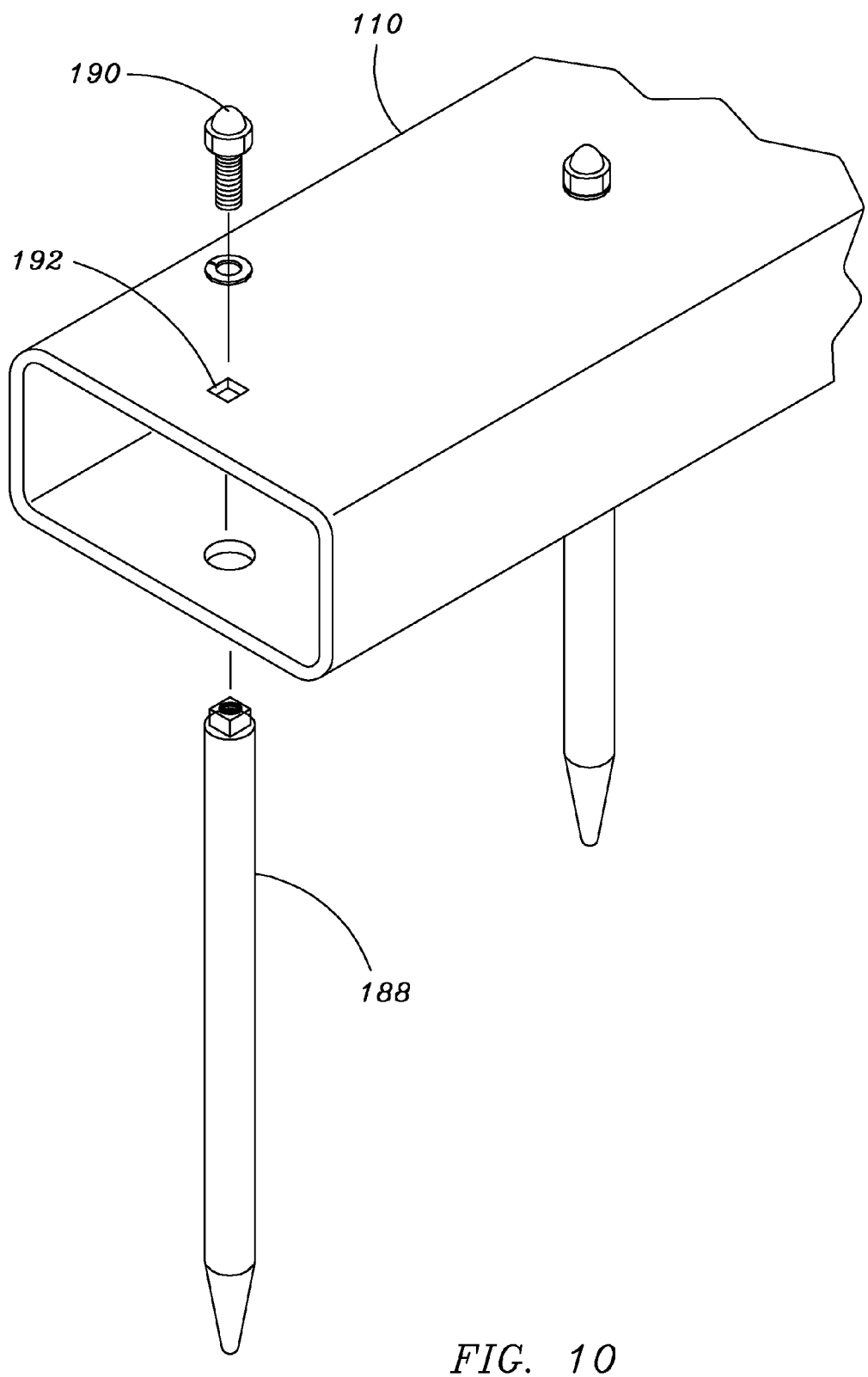

FIG. 10 is a partial exploded isometric view illustrating a spike tube for an earth working apparatus, such as the earth working apparatus illustrated in FIGS. 1 and 5, where spikes are configured to be attached to the spike tube in accordance with an example embodiment of the present disclosure.

Figure 11:
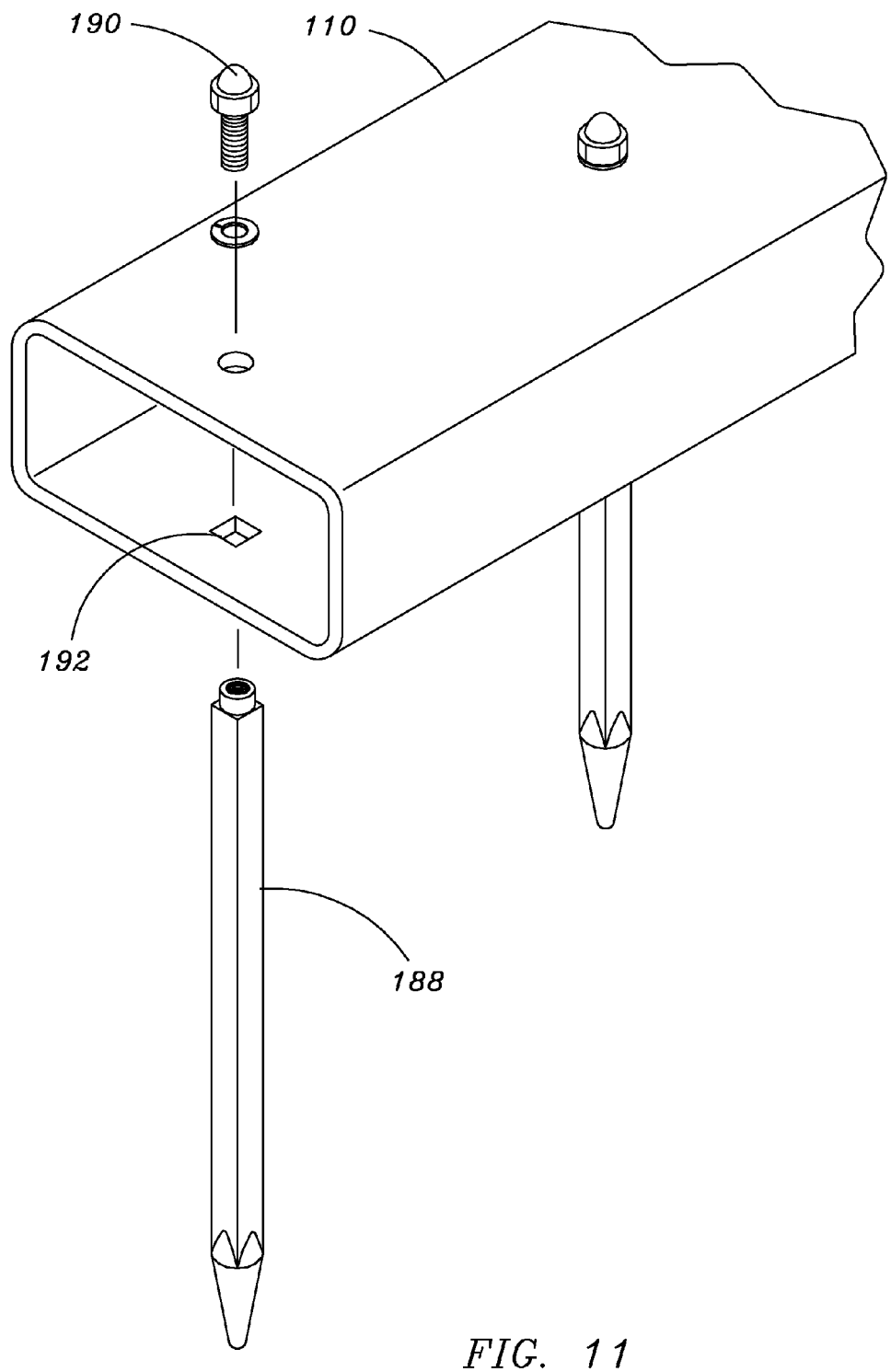

FIG. 11 is another partial exploded isometric view illustrating a spike tube for an earth working apparatus, such as the earth working apparatus illustrated in FIGS. 1 and 5, where spikes are configured to be attached to the spike tube in accordance with an example embodiment of the present disclosure.

Figure 12:
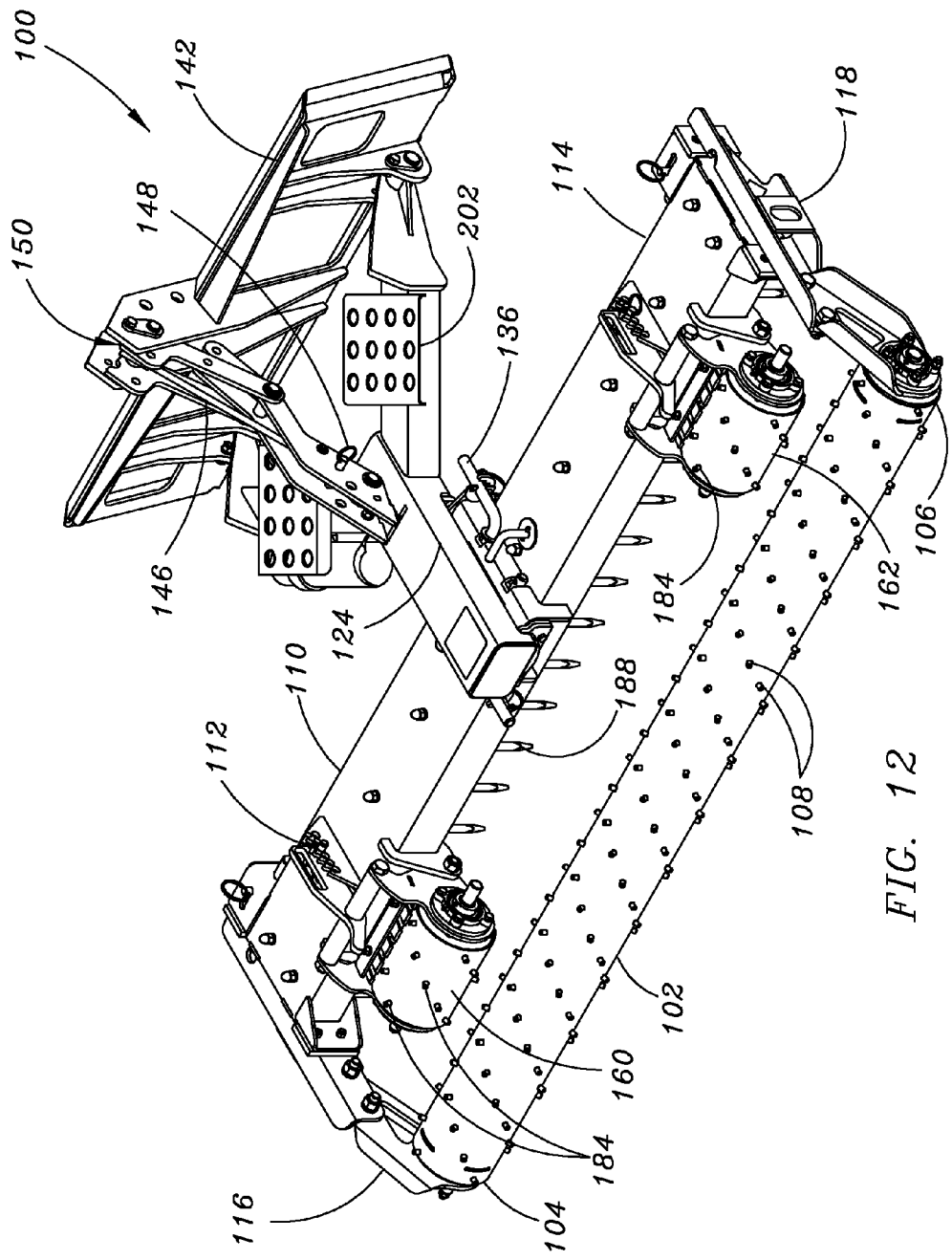

FIG. 12 is an isometric view illustrating an earth working apparatus configured to attach a vehicle, such as a skid steer vehicle, where the earth working apparatus includes a connecting support configured to connect to the vehicle, a tongue extending from the connecting support, and a spike tube pivotally coupled with the tongue by a torsion coupler, where the spike tube is configured to be quickly attached to and detached from the tongue, and where spikes, a roller, and gauge wheels are attached to the spike tube in accordance with an example embodiment of the present disclosure.

Figure 13:
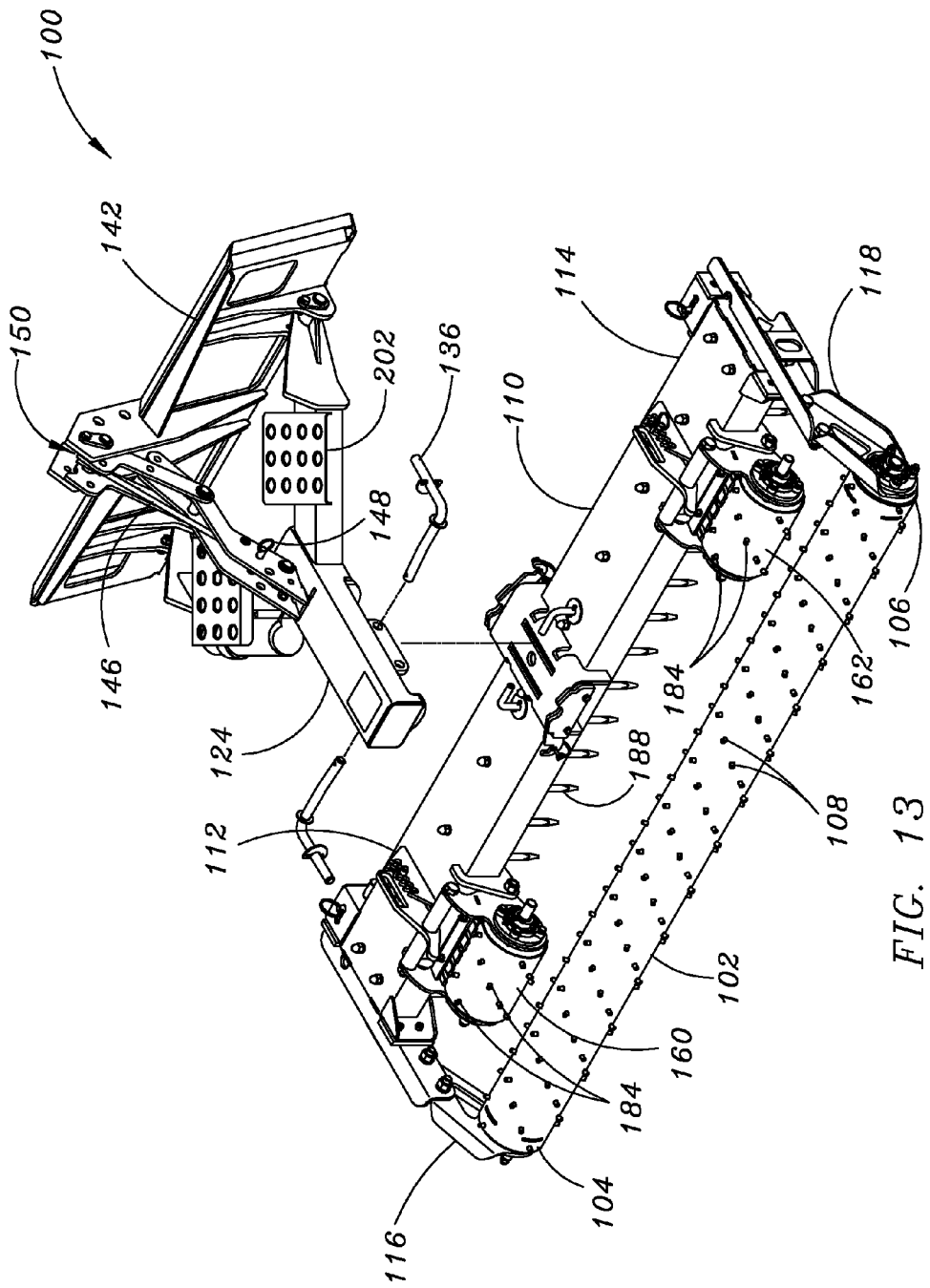

FIG. 13 is an exploded isometric view of the earth working apparatus illustrated in FIG. 12.

Figure 14:
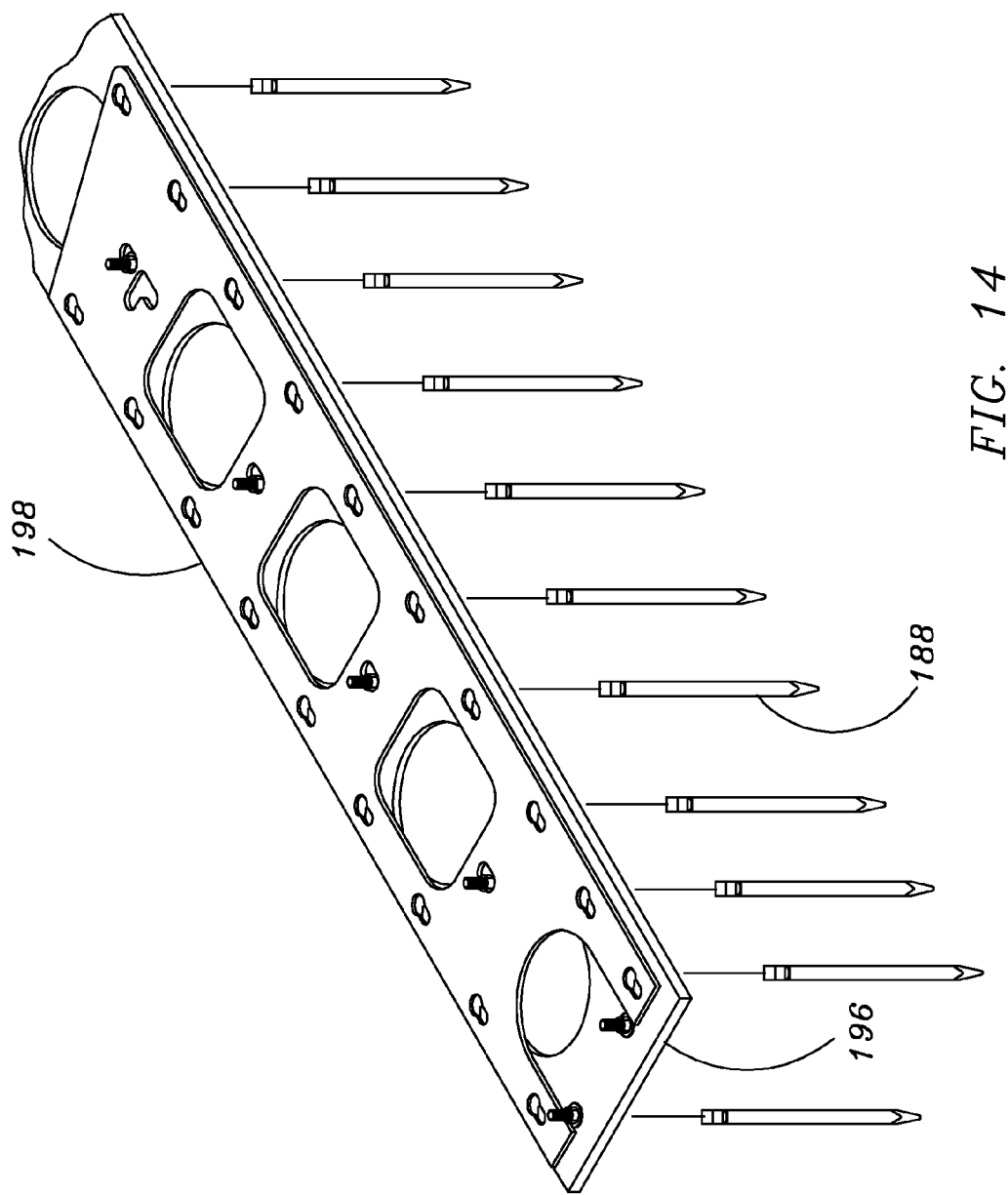

FIG. 14 is a partial exploded isometric view illustrating a spike retention plate, a spike stabilizer plate, and spikes for an earth working apparatus, such as the earth working apparatus illustrated in FIG. 12, where the spikes are configured to be quickly attached and detached in accordance with an example embodiment of the present disclosure.

Figure 15:
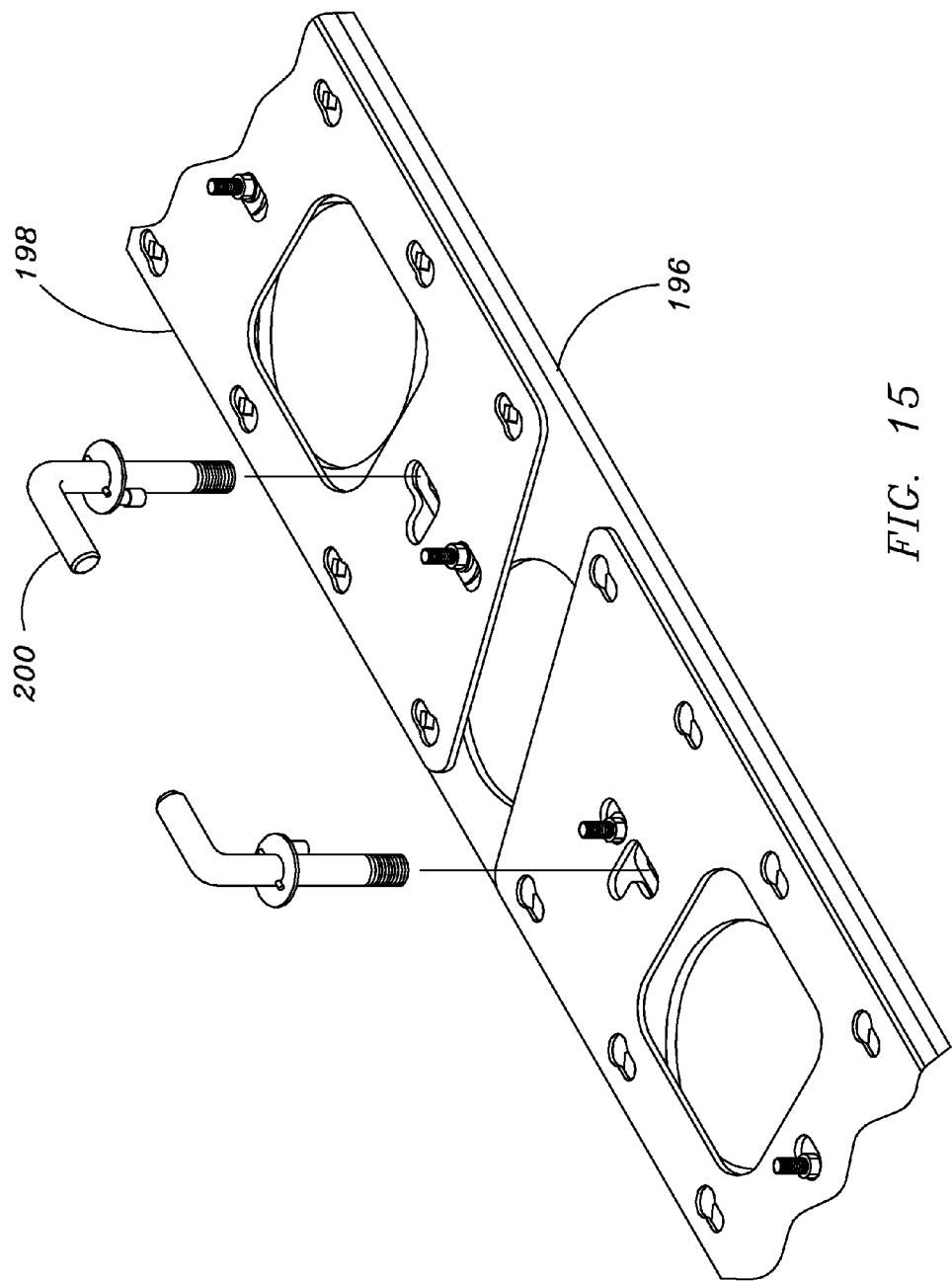

FIG. 15 is a partial exploded isometric view of the spike retention plate and the spike stabilizer plate illustrated in FIG. 14, where spike release handles are used to retain the spikes in accordance with an example embodiment of the present disclosure.

Figure 16:
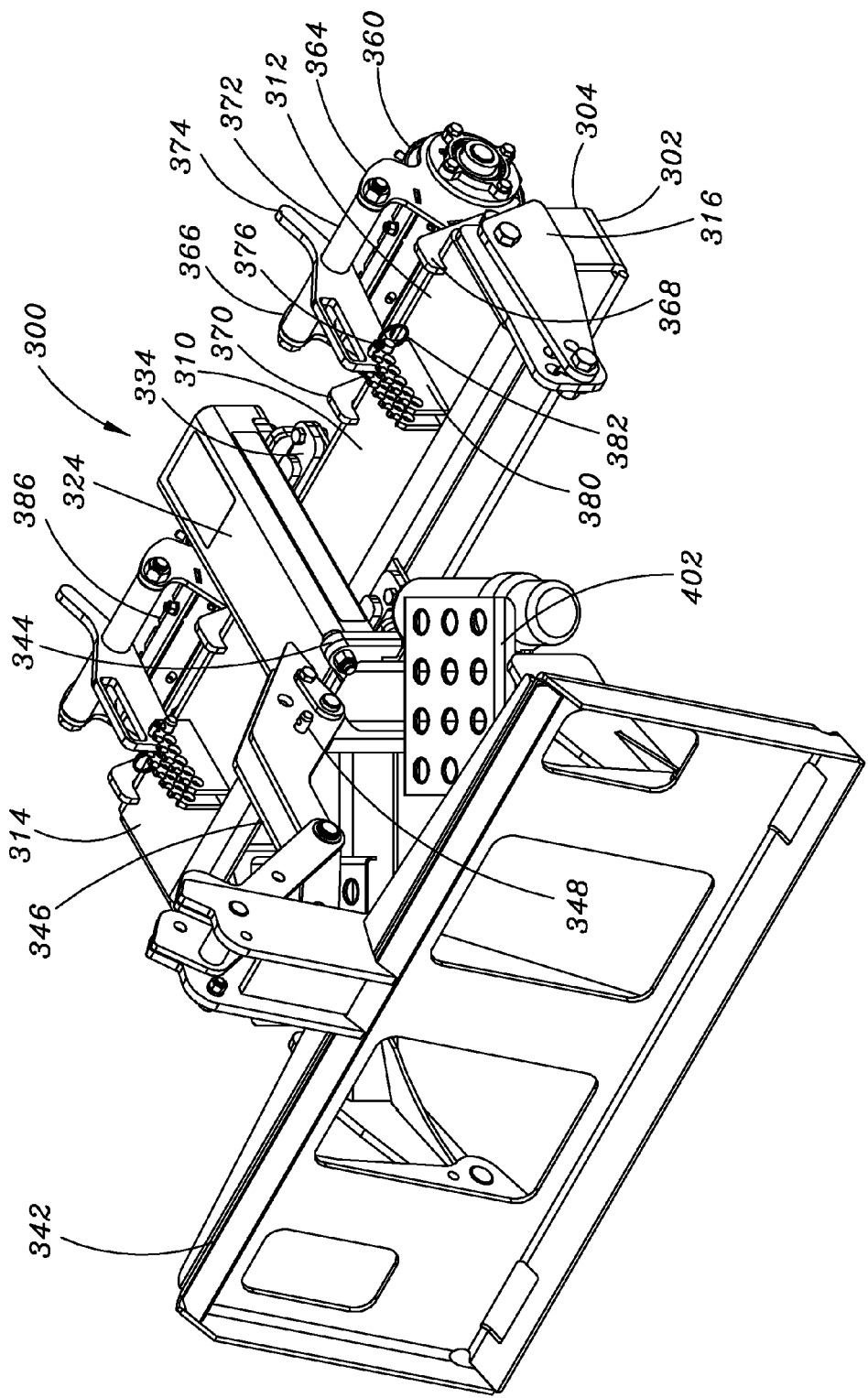

FIG. 16 is an isometric view illustrating an earth working apparatus configured to attach a vehicle, such as a skid steer vehicle, where the earth working apparatus includes a connecting support configured to connect to the vehicle, a tongue extending from the connecting support, and a tube pivotally coupled with the tongue by a torsion coupler, and where a blade and gauge wheels are attached to the tube in accordance with an example embodiment of the present disclosure.

Figure 17:
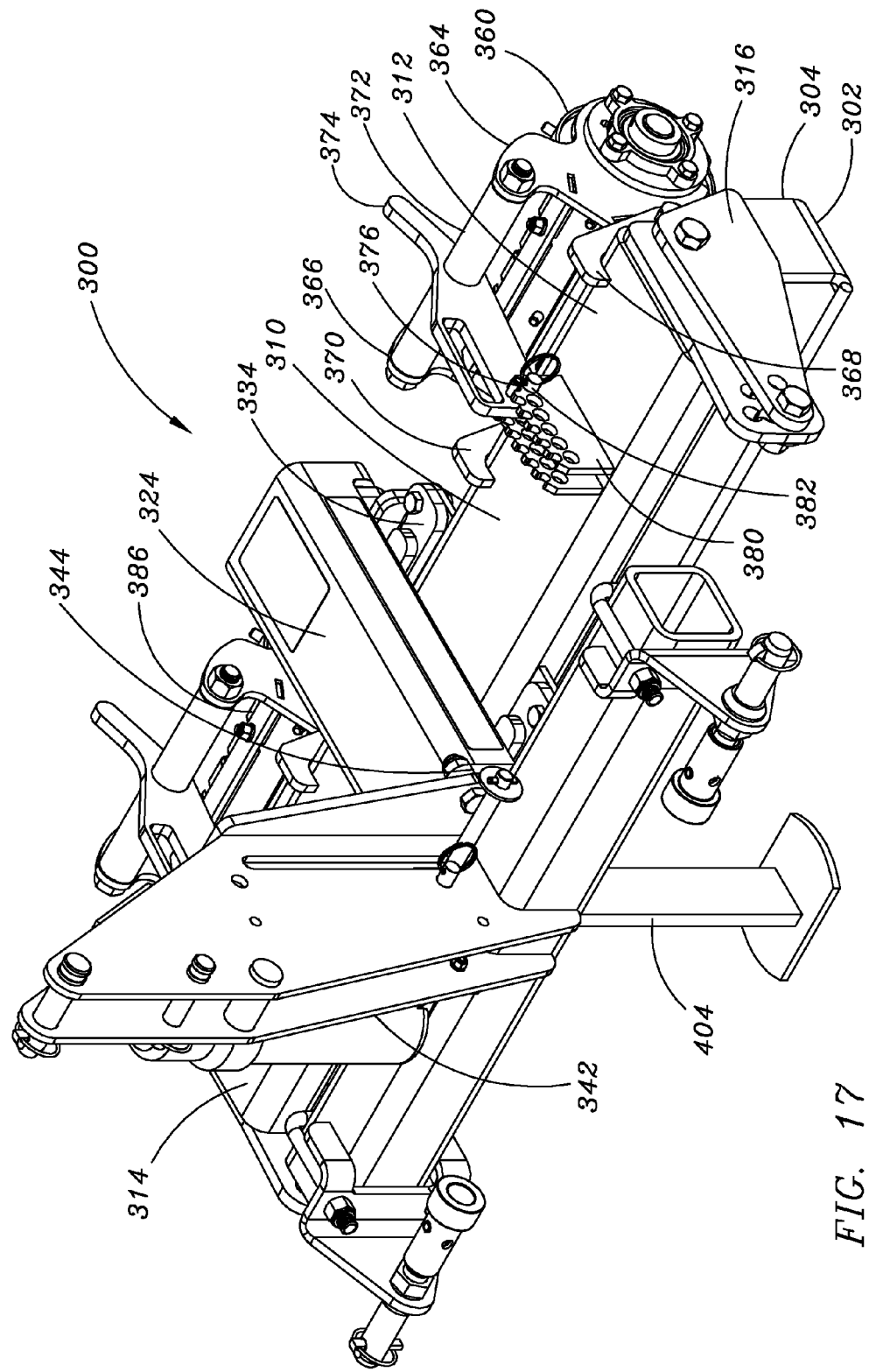

FIG. 17 is an isometric view illustrating an earth working apparatus configured to attach a vehicle, such as a tractor, where the earth working apparatus includes a three-point attachment configured to connect to the tractor, a tongue extending from the three-point attachment, and a tube pivotally coupled with the tongue by a torsion coupler, and where a blade and gauge wheels are attached to the tube, and the tube is attached to the tongue in a push configuration, in accordance with an example embodiment of the present disclosure.

Figure 18:
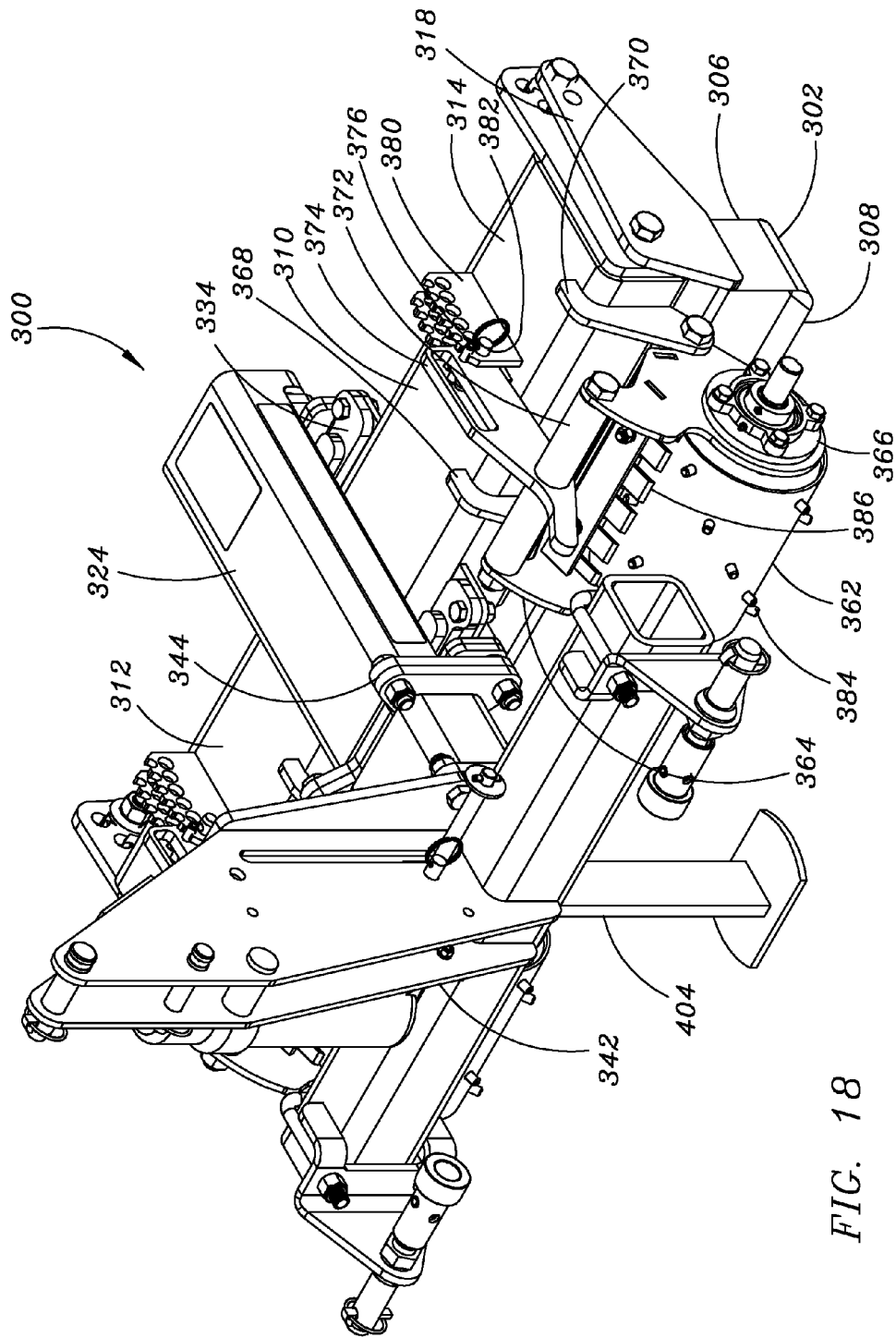

FIG. 18 is another isometric view of the earth working apparatus illustrated in FIG. 17, where the tube is attached to the tongue in a pull configuration.

Figure 19:
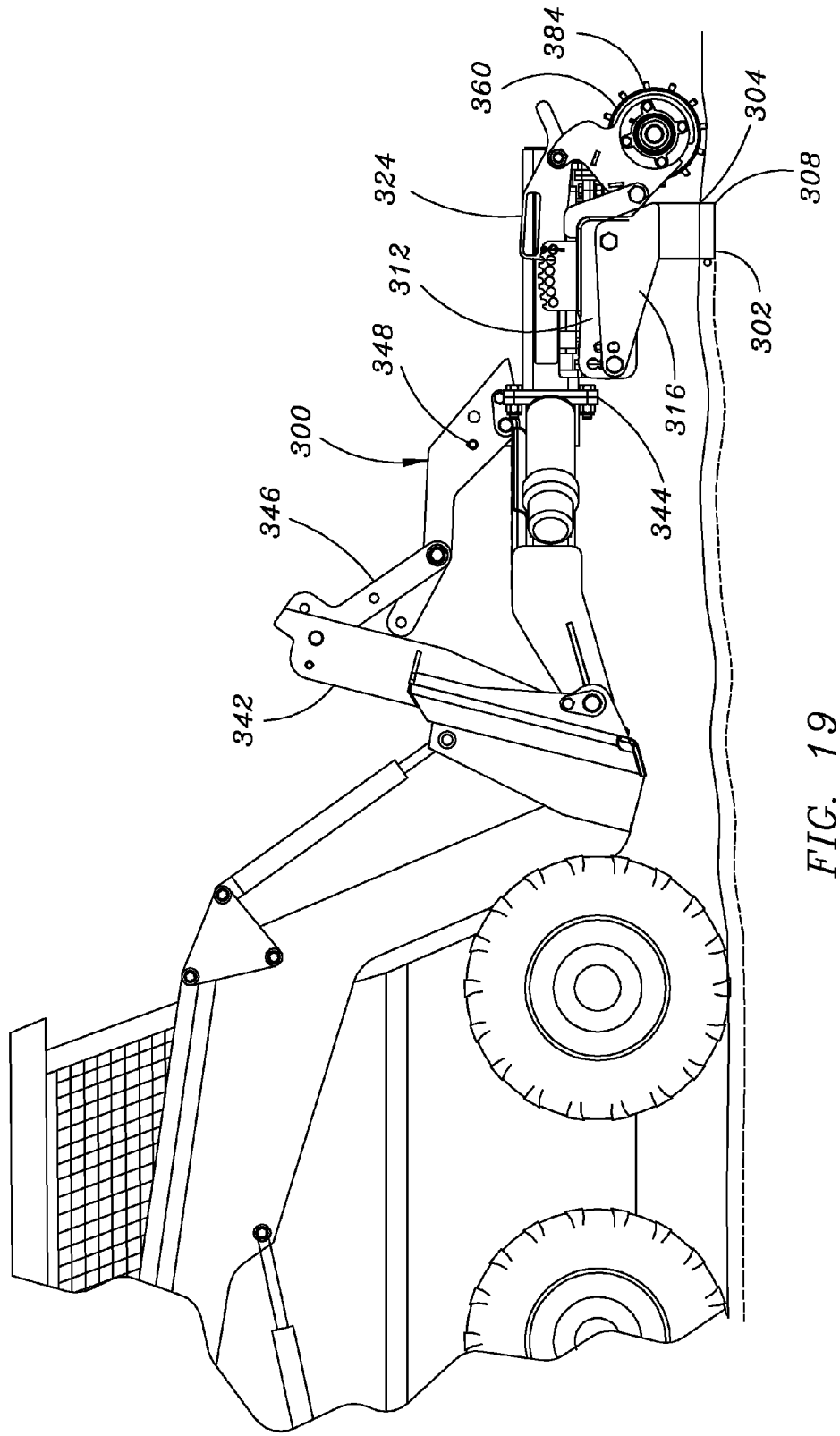

FIG. 19 is a side elevation view illustrating an earth working apparatus, such as the earth working apparatus illustrated in FIG. 16, where the earth working apparatus is attached to a skid steer vehicle in a floating working orientation in accordance with example embodiments of the present disclosure.

Figure 20:
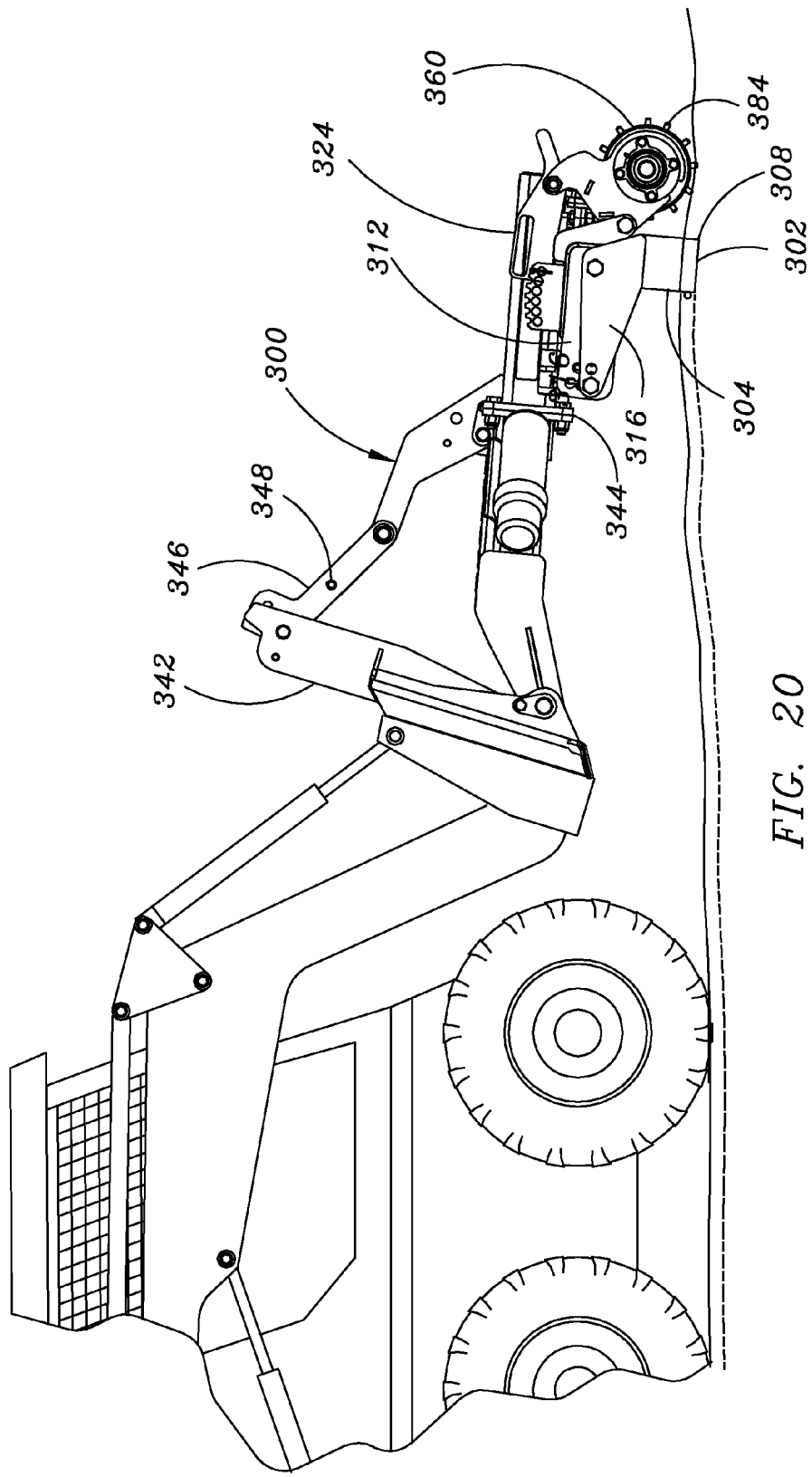

FIG. 20 is another side elevation view of the earth working apparatus illustrated in FIG. 19, where the earth working apparatus is in a fixed working orientation in accordance with example embodiments of the present disclosure.

Figure 3A:
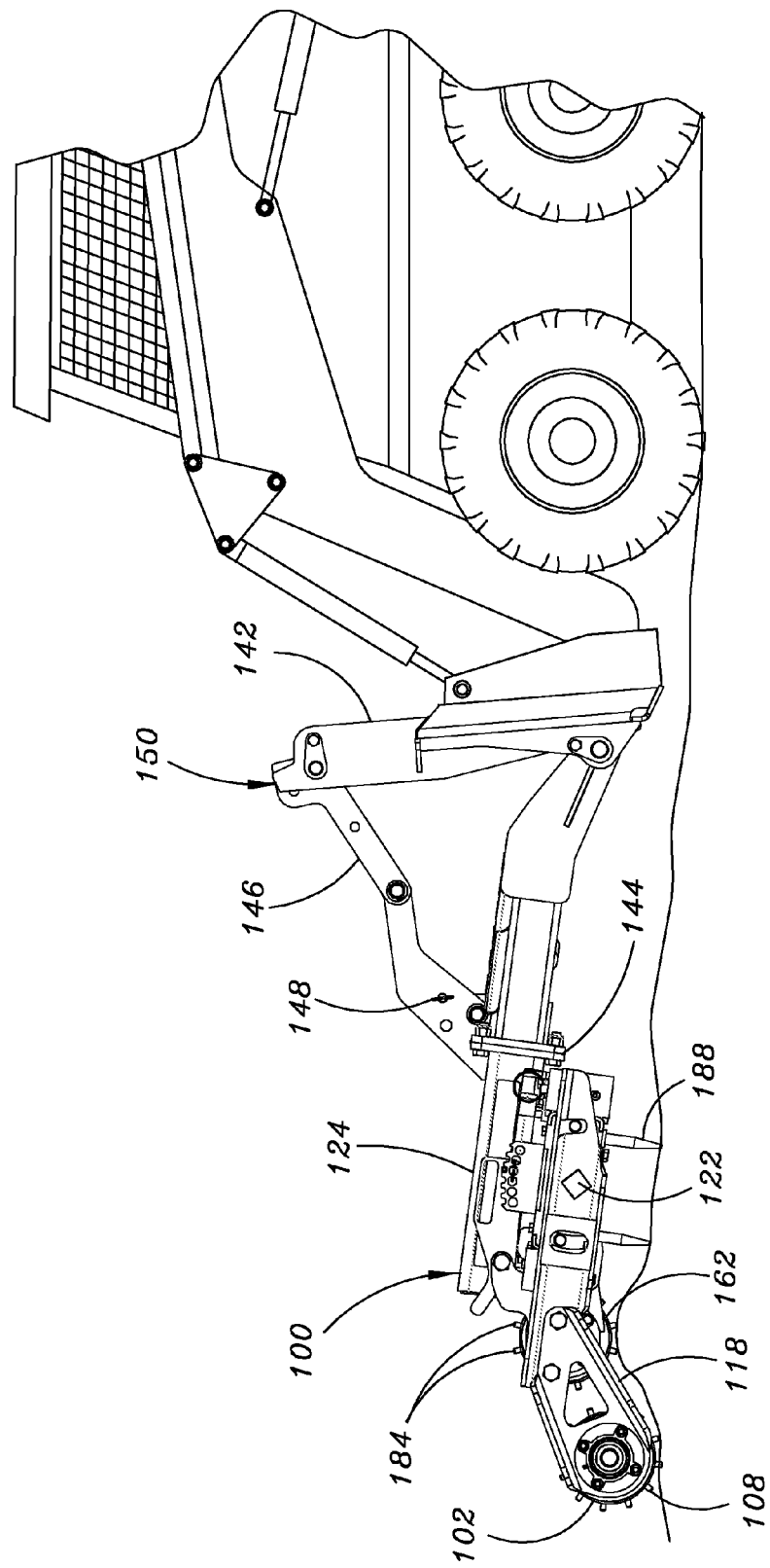
FIG. 3A is a side elevation view illustrating an earth working apparatus, such as the earth working apparatus illustrated in FIG. 1, where the earth working apparatus is attached to a skid steer vehicle in a working orientation in accordance with example embodiments of the present disclosure.
Figure 21:
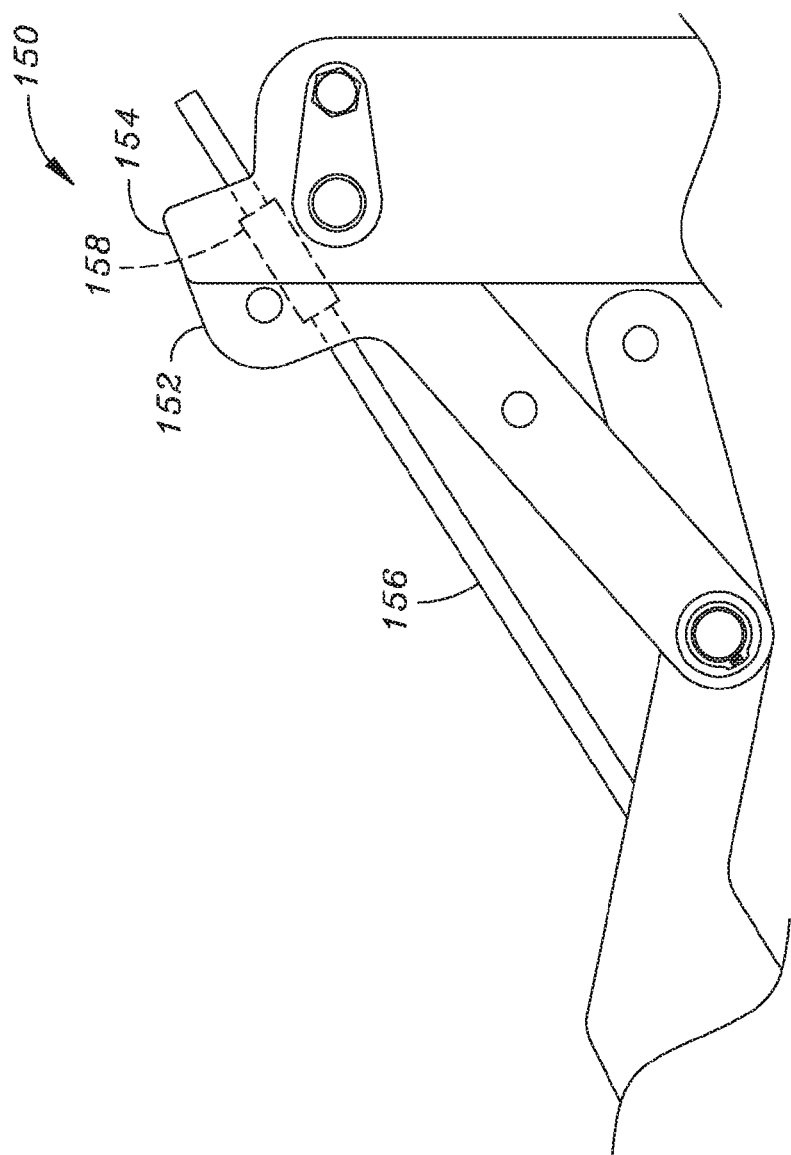

FIG. 21 is a partial side elevation view of the earth working apparatus illustrated in FIG. 3A.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Site preparation for planting seed or sodding generally requires that the ground is graded. For example, a front end loader attachment for a skid steer vehicle is used to break up the soil and then level the soil to a desired grade, referred to as a "rough grade." Then, a tractor is typically used to drag an attachment that establishes a fine grade. However, this process uses one machine for the rough grade and another machine for the fine grade. Further, the operator of the tractor looks backward to monitor the progress of the fine grade while dragging the attachment, limiting operator comfort, visibility, and/or control. Additionally, tractor attachments are generally fixed and do not flow with the contours of the land, requiring multiple passes to establish a fine grade.

Figure 2:
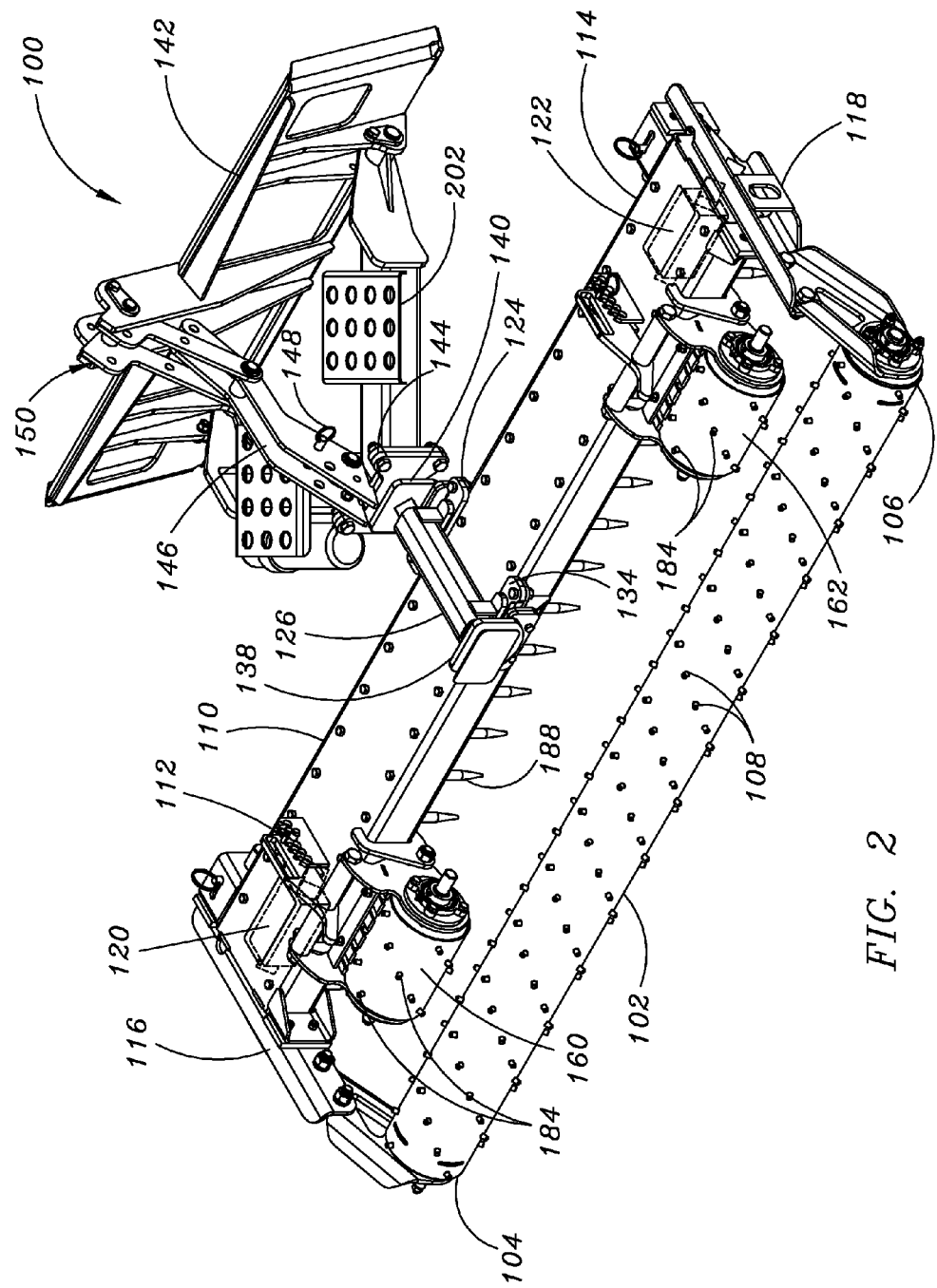
FIG. 2 is a partial isometric view of the earth working apparatus illustrated in FIG. 1, where a portion of the tongue is removed to further illustrate the torsion coupler.
Figure 3B:
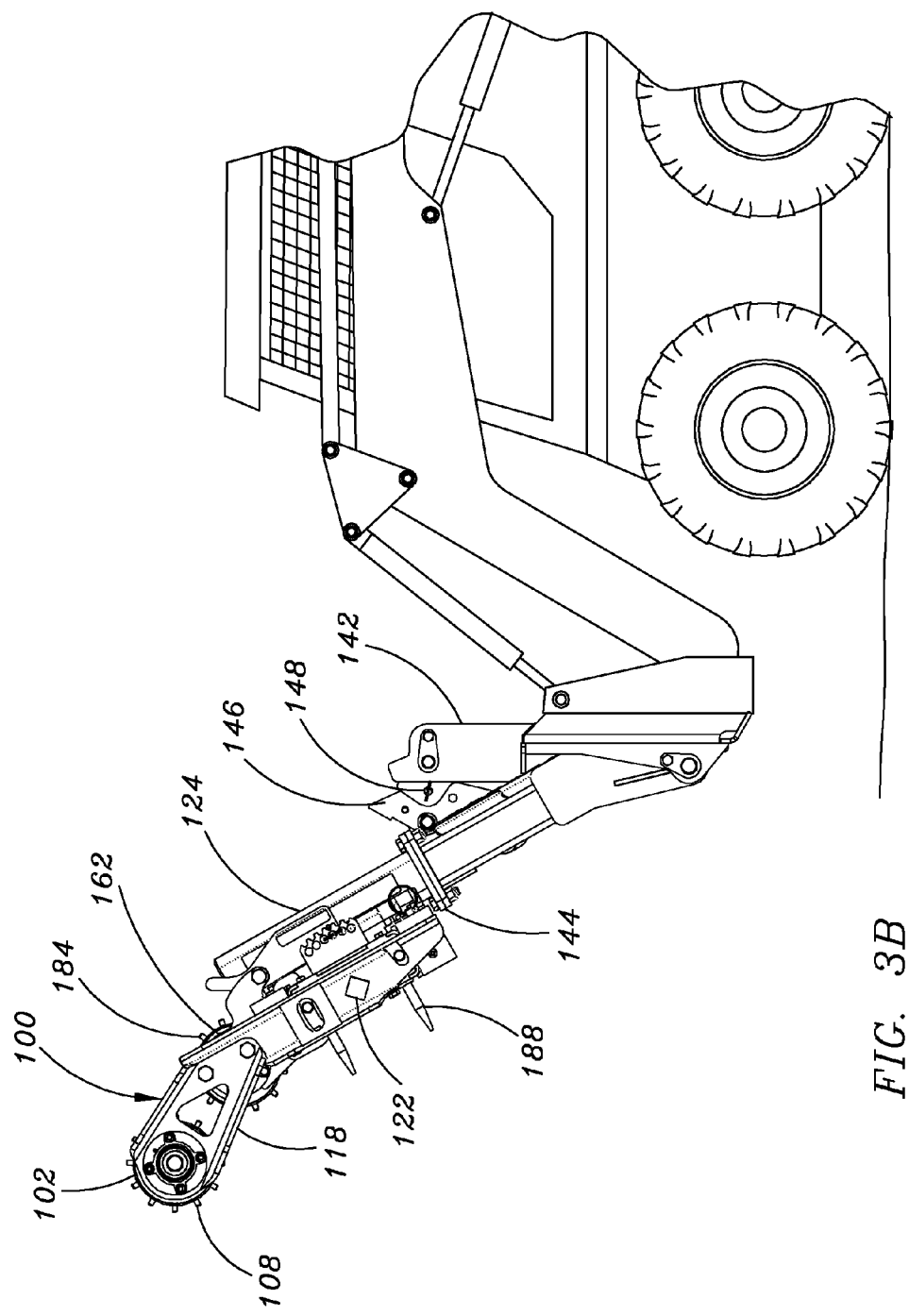
FIG. 3B is a side elevation view of the earth working apparatus illustrated in FIG. 3A, where the earth working apparatus is in a transport orientation in accordance with example embodiments of the present disclosure.
Figure 3C:
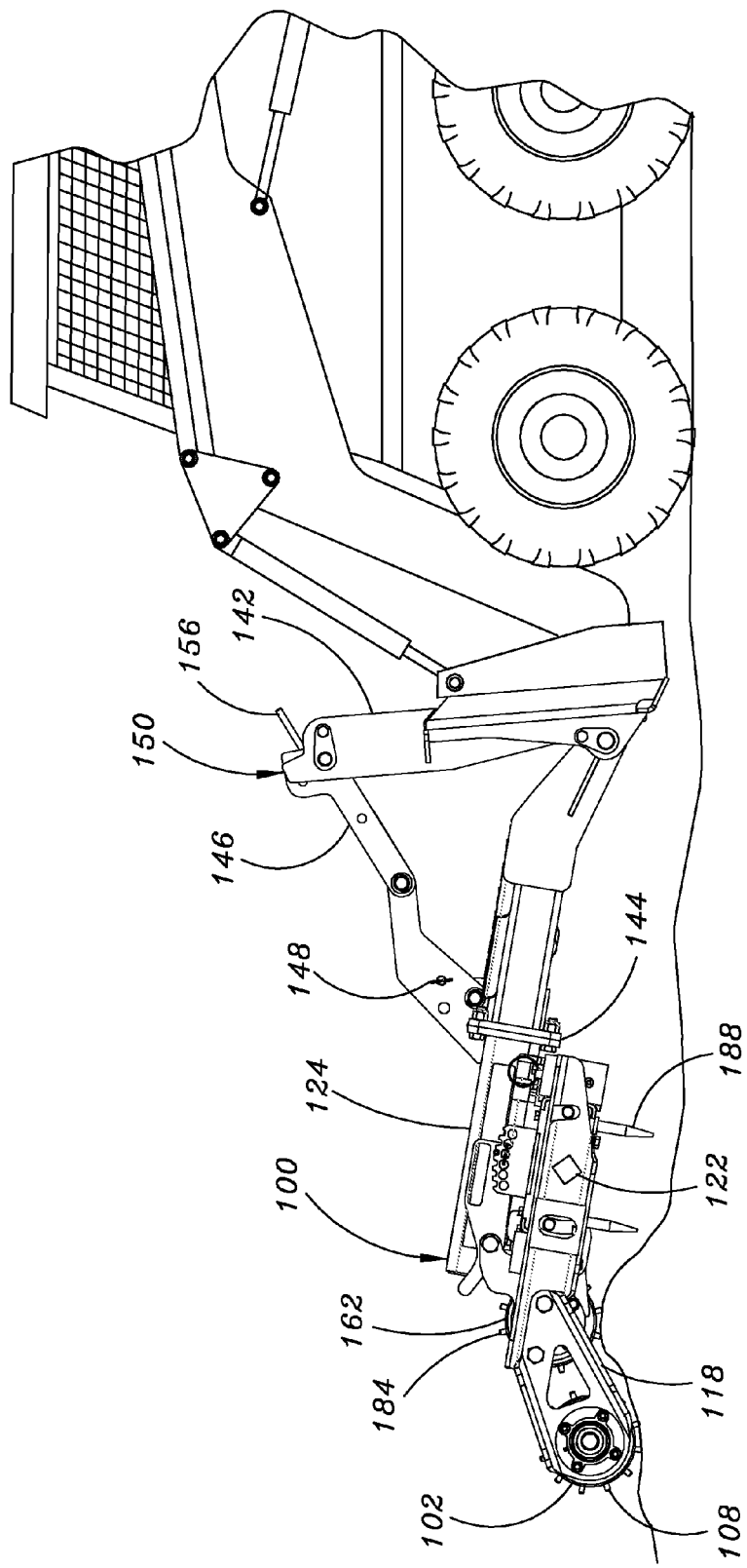
FIG. 3C is a side elevation view of the earth working apparatus illustrated in FIG. 3A, where the earth working apparatus is in the working orientation in accordance with example embodiments of the present disclosure.

Referring generally to FIGS. 1 through 15, dirt pulverizing fine earth graders 100 are described in accordance with example embodiments of the present disclosure. In embodiments of the disclosure, the earth graders 100 can be attached to a vehicle capable of performing both a rough grade and a fine grade, such as a skid steer vehicle (e.g., as shown in FIGS. 3A through 3C). However, the earth graders 100 can also be attached to other types of vehicles, such as a tractor. Further, the earth graders 100 are configured to be pushed and/or pulled by the vehicle (e.g., pushed by a skid steer vehicle or pulled by a tractor). As described herein, the earth graders 100 can be used to prepare soil to a finish grade for seeding, sodding, and other landscaping in various uneven soil conditions. The earth graders 100 provide consistent penetration during forward and/or backward motion while automatically following the soil contour. In some embodiments, an earth grader 100 has a swath width between about forty inches (40 in.) and about eighty-five inches (85 in.) (e.g., about seventy-six inches (76 in.)). However, these values are provided by way of example only and are not meant to limit the present disclosure. In other embodiments, an earth grader 100 has a swath width of less than forty inches (40 in.), more than eighty-five inches (85 in.), and so forth.

In embodiments of the disclosure, the earth graders 100 provide automatic pitch and roll adjustment (e.g., using a collapsible flex link and floating spike tube and roller configuration), which allows the earth graders 100 to be driven smoothly over vertically and/or horizontally uneven terrain. The earth graders 100 provide a non-powered spike and spiked roller configuration, which can produce a soil finish without powered tillage of the soil. Consistent and precise spike depth can be maintained with longer spike tooth life. Additionally, gouging of the soil can be prevented or minimized, reducing the power consumption of the vehicle. Further, operational fatigue and maintenance requirements can be reduced. For example, greaseless pivot points provide ease of maintenance. In some embodiments, visibility for an operator (e.g., from the seat of a skid steer vehicle) can also be improved.

In embodiments of the disclosure, an earth grader 100 includes a working implement (e.g., a dirt pulverizing roller 102) having a first end 104 and a second end 106. The roller 102 includes studs 108 configured to break apart dirt clods and/or cover tracks left by a vehicle used to drive the earth grader 100, other earth working equipment, and so forth. The earth grader 100 also includes a first support (e.g., a spike tube 110) for supporting the roller 102. The spike tube 110 also has a first end 112 and a second end 114. A first arm (e.g., a first roller hanger 116) connects the first end 104 of the roller 102 to the first end 112 of the spike tube 110, and a second arm (e.g., a second roller hanger 118) connects the second end 106 of the roller 102 to the second end 114 of the spike tube 110.

In some embodiments, the first roller hanger 116 and the second roller hanger 118 are pivotally coupled with the spike tube 110 by a first torsion coupler. For example, the first roller hanger 116 is pivotally coupled with the spike tube 110 by a first torsion mount 120 proximate to the first end 112 of the spike tube 110, and the second roller hanger 118 is pivotally coupled with the spike tube 110 by a second torsion mount 122 proximate to the second end 114 of the spike tube 110. For instance, a first torsion bar is fixedly attached (e.g., integrally formed, welded) to the first roller hanger 116, while a first tube is fixedly attached (e.g., bolted, welded) to the spike tube 110. Elastically deformable members, such as elastic polymeric (e.g., synthetic rubber) cords are used to suspend the first torsion bar in the first tube. Similarly, a second torsion bar is fixedly attached to the second roller hanger 118, while a second tube is fixedly attached to the spike tube 110. Elastically deformable members are also used to suspend the second torsion bar in the second tube.

However, this configuration is provided by way of example only and is not meant to limit the present disclosure. In other embodiments, the first roller hanger 116 and the second roller hanger 118 are coupled with the spike tube 110 by a single torsion mount (e.g., a torsion bar extending from the first end 112 of the spike tube 110 to the second end 114 of the spike tube 110 and connecting the first roller hanger 116 to the second roller hanger 118). In either configuration, the first torsion coupler provides non-wearing, non-lubrication pivot points. The first torsion coupler also generates added down pressure on the roller 102 without an additional roller weight requirement. Further, the first torsion coupler can slow the impact speed of the roller 102, reducing the potential for damage to a downward roller stop when the earth grader 100 is raised quickly.

A second support (e.g., a tongue 124) is connected to the spike tube 110. In some embodiments, the spike tube 110 is pivotally coupled with the tongue 124 by a second torsion coupler (e.g., a torsion mount 126). As shown in FIG. 7, the torsion mount 126 includes a solid torsion bar 128 extending through a tube 130. The torsion bar 128 is suspended in the tube 130 by elastically deformable members, such as elastic polymeric (e.g., synthetic rubber) cords 132. In embodiments of the disclosure, the torsion bar 128 is fixedly attached (e.g., integrally formed, welded) to a support configured to connect to a vehicle, while the tube 130 is fixedly attached (e.g., bolted, welded) to another support that connects the tongue 124 to the spike tube 110. For example, the tube 130 is fixedly attached to a four (4) bolt connector 134 that attaches the spike tube 110 to the tongue 124. In embodiments of the disclosure, the connector 134 provides a symmetrical bolt hole pattern, allowing the spike tube 110 to be attached to the tongue 124 in either a push or pull configuration. In other embodiments, the earth grader 100 includes a quick connect (e.g., as shown in FIGS. 12 and 13). For example, the earth grader 100 uses eccentric pin locks (e.g., with quarter turn cam lock pins 136).

In some embodiments, the torsion mount 126 provides between about fifty foot-pounds (50 ft-lbs.) and about two hundred foot-pounds (200 ft-lbs) (e.g., about one hundred and fifty foot-pounds (150 ft-lbs.)) of torsional resistance at about twenty-one degrees (21°) of rotation. However, these values are provided by way of example only and are not meant to limit the present disclosure. In other embodiments, the torsion mount 126 provides less than fifty foot-pounds (50 ft-lbs.) of torsional resistance at about twenty-one degrees (21°) of rotation, more than two hundred foot-pounds (200 ft-lbs) of torsional resistance at about twenty-one degrees (21°) of rotation, and so forth. As described herein, the central torsion spike tube mounting configuration allows the spike tube 110 to return to level spike positioning when not engaged to ground (e.g., for transport). The central torsion spike tube mounting also provides lubrication-free pivotal engagement for increased life and/or reduced maintenance of the earth grader 100. In some embodiments, the earth grader 100 includes one or more replaceable wear blocks 138 and/or 140 for the central torsion components to provide positive, high durability, push and pull contact surfaces. In some embodiments, the wear blocks 138 and/or 140 are fabricated from ultra-high-molecular-weight polyethylene (UHMWPE).

In embodiments of the disclosure, a third support (e.g., a connecting support 142) is connected to the spike tube 110 and/or the tongue 124. The connecting support 142 is configured to attach to a vehicle, such as a skid steer vehicle, a tractor, and so forth. For example, the connecting support 142 comprises a skid steer mounting connector for attaching to a skid steer vehicle (e.g., as shown in FIGS. 1 through 4, 12, and 13), a three-point attachment (hitch, linkage) for attaching to a tractor (e.g., as shown in FIGS. 5 and 6), and so forth. The spike tube 110 and/or the tongue 124 are configured to extend from the connecting support 142 generally horizontally in a working orientation (e.g., as shown in FIGS. 3A and 3C). For example, the tongue 124 is connected to the connecting support 142 by a four (4) bolt joint 144 (e.g., allowing the tongue 124 to be connected to different hitch types). In some embodiments, the spike tube 110 and/or the tongue 124 are configured to articulate with respect to the connecting support 142 between the working orientation and a transport orientation, where the spike tube 110 and/or the tongue 124 are angled away from the generally horizontal working orientation (e.g., as shown in FIG. 3B). Further, the articulation between the spike tube 110 and/or the tongue 124 and the connecting support 142 allows the spike tube 110 to move in a vertical manner over the contours of the terrain. In this manner, the spike tube 110 can move somewhat independently of the vehicle, allowing the earth grader 100 to flow over uneven terrain and eliminating much of the hand labor associated with gouging.

In some embodiments, the earth grader 100 includes a collapsible flex link 146. The flex link 146 can be configured to prevent the spike tube 110 and/or the tongue 124 from hyper-extending with respect to the connecting support 142 (e.g., restricting flex of the earth grader 100 to one direction in a working orientation). In one example, the flex link 146 can include three (3) pivot points, and two rigid portions, which can be maintained at a relative angle to one another so that flex link 146 cannot be completely straightened (e.g., the rigid portions of the flex link 146 are maintained at an angle of less than one hundred and eighty degrees (180°) with respect to one another). In this manner, the flex link 146 allows the earth grader 100 to be carried in a transport orientation, floated in a working orientation, lifted into a trailer transport orientation, and/or locked in a rigid, non-collapsed position. The earth grader 100 can be locked into various fixed positions (e.g., the transport position shown in FIG. 3B and/or a fixed working orientation). In some embodiments, a ball lock pin 148 is used to lock the spike tube 110 and/or the tongue 124 into a particular orientation with respect to the connecting support 142.

Figure 4:
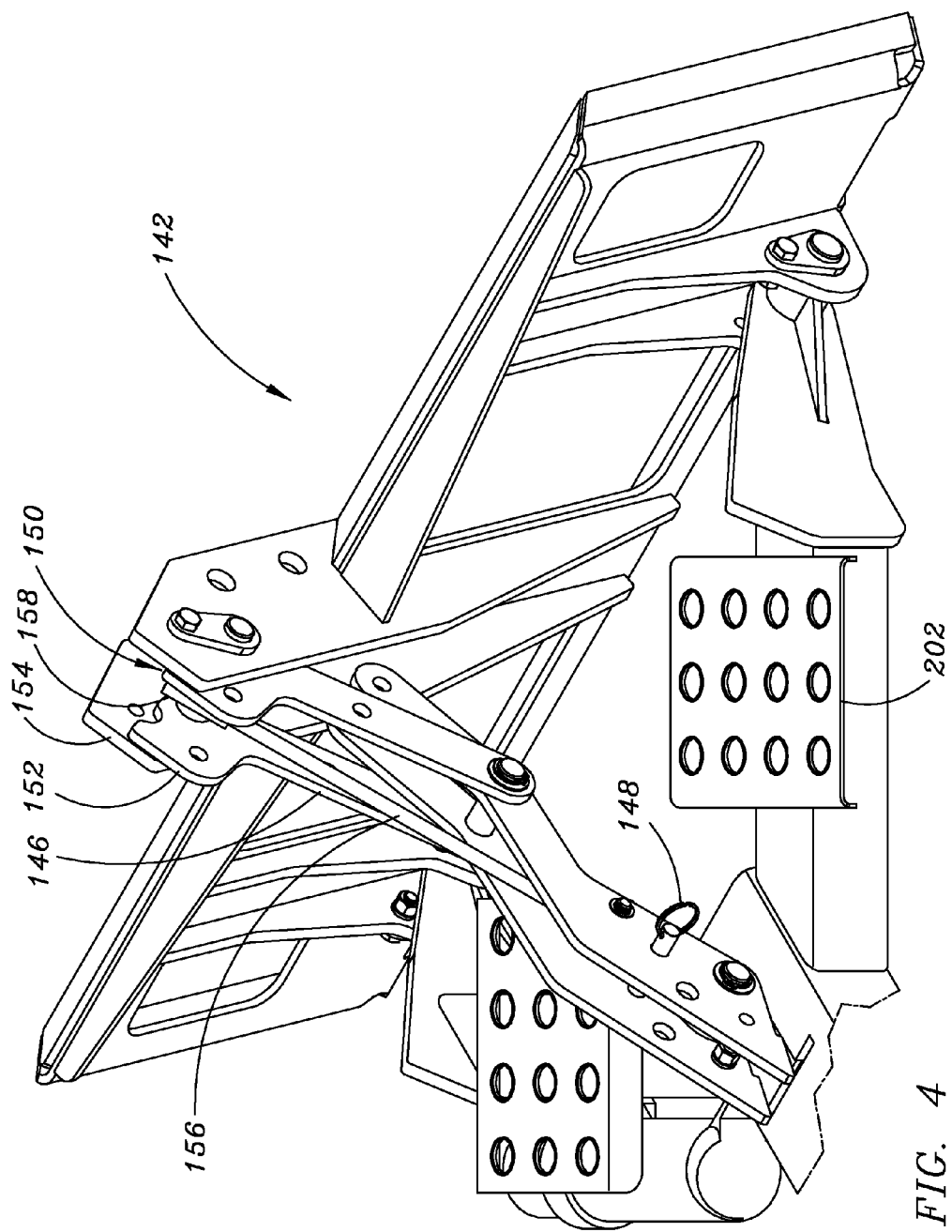
FIG. 4 is an isometric view illustrating a connecting support for an earth working apparatus, such as the earth working apparatus illustrated in FIG. 1, in accordance with an example embodiment of the present disclosure.

In some embodiments, the earth grader 100 includes a visual sight gauge 150 to facilitate maintaining a desired working angle of the spike tube 110 with respect to the ground (e.g., as shown in FIG. 3A). For example, a sight gauge 150 is implemented using visual alignment of top surfaces 152 and 154 of mating components (e.g., as shown in FIG. 4). In other embodiments, a sight gauge 150 is implemented using a rod 156 that extends through a sleeve 158, where one end of the rod 156 is connected proximal to the spike tube 110 at one end of the flex link 146, and the other end of the rod 156 extends through a sleeve 158 connected distal to the spike tube 110 at the other end of the flex link 146 (e.g., also as shown in FIG. 4). Using either or both configurations, an operator (e.g., of a skid steer vehicle) can adjust the tilt of, for example, a bucket attachment to position the earth grader 100 in a desired working position. For example, when the top surfaces 152 and 154 both extend in generally the same plane or are generally parallel, the operator knows the earth grader 100 is appropriately positioned. However, when the top surfaces 152 and 154 lie in different planes or are disposed at an angle substantially different than one hundred and eighty degrees (180°) with respect to one another, the operator is alerted to change the tilt angle of the bucket. Further, when the rod 156 extends out from the sleeve 158 beyond a mark on the rod 156, the operator is alerted to change the tilt angle of the bucket.

In embodiments of the disclosure, the earth grader 100 includes one or more adjustable gauge wheels 160 and/or 162 for controlling the height of the spike tube 110 with respect to the ground during operation of the earth grader 100. For example, with reference to FIG. 8, a gauge wheel 162 is attached to the spike tube 110 by forks 164 and 166 on either side of the gauge wheel 162. The forks 164 and 166 are pivotally connected (e.g., bolted) to gussets 168 and 170, respectively, at the bottoms of the forks 164 and 166. The gussets 168 and 170 are fixedly attached (e.g., bolted, welded) to the spike tube 110. At the top of the forks 164 and 166, a sleeve 172 is pivotally connected (e.g., bolted) to the forks 164 and 166. The sleeve 172 is fixedly attached (e.g., integrally formed, welded) to a handle 174. The handle 174 includes a roll pin 176 that interfaces with a comb 180 fixedly attached (e.g., bolted, welded) to the spike tube 110.

The roll pin 176 is used as a guide when adjusting the height of the gauge wheel 162 by interfacing with slots on the comb 180. For example, after adjusting the gauge wheel 162 to a desired height, the gauge wheel 162 is locked in place with a pull pin 182 placed into an aligned hole associated with the desired comb slot. In this manner, the gauge wheel 162 allows the spike tube 110 to be set to a desired height above the soil. In some embodiments, the gauge wheel 162 is adjustable at about one-half inch (½ in.) intervals up to about two and one-half inches (2½ in.). However, it should be noted that these values are provided by way of example only and are not meant to limit the present disclosure. In other embodiments, the gauge wheel can be adjusted at different intervals up to more or less than about two and one-half inches (2½ in.).

As wear occurs to the spikes of the spike tube 110, the height of the spike tube 110 can be adjusted accordingly using the gauge wheels 160 and/or 162. In some embodiments, the gauge wheels 160 and 162 include spikes (e.g., studs 184), which match, or at least substantially match, the footprint of the roller 102 to reduce (e.g., eliminate) additional patterns in finished soil. Further, the earth grader 100 can include one or more scrapers 186 associated with a gauge wheel to remove soil from the wheel. It should be noted that while the gauge wheels 160 and 162 are shown on one side of the spike tube 110 in the embodiments illustrated in the accompanying figures, gauge wheels can also be included on the other side of the spike tube 110, on both sides of the spike tube 110, and/or at different locations with respect to the spike tube 110.

The earth grader 100 includes downwardly extending spikes 188 for engaging packed soil to be loosened. In some embodiments, the spikes 188 are secured to the spike tube 110 with top bolts 190 (e.g., as shown in FIGS. 10 and 11). Further, the spike tube 110 can include one or more flat spots 192 that interface with mating portions of the spikes 188. In this manner, the spikes 188 can be fully captured and retained by the spike tube 110, while facilitating quick and efficient spike tube assembly and replacement of the spikes 188. Further, in some embodiments, underside reinforced spike retention is provided using reinforcements 194 (e.g., thickened and/or welded reinforcements positioned on the spike tube 110).

Referring now to FIGS. 14 and 15, in some embodiments, an earth grader 100 includes a sub-assembled internal spike tube stabilizer plate 196. The spike tube stabilizer plate 196 can provide for quick assembly of components, and/or eliminate the need for interior position welding of components. Further, strategically located hole cutouts can reduce weight while providing material availability for small machine components. In some embodiments, the earth grader 100 includes a spike retention plate 198 having hourglass hole shapes that engage or disengage the end of each spike 188. In this configuration, minimum plate contact slides can allow for easy operation. In some embodiments, the earth grader 100 includes quarter turn pin spike release handles 200. The spike release handles 200 can engage and disengage the spikes 188 for quick service (e.g., without the use of additional tools).

In some embodiments, the earth grader 100 includes one or more steps 202 (e.g., for the convenience of an operator entering or exiting a skid steer vehicle). For example, the steps 202 are fixedly attached (e.g., bolted, welded) to the connecting support 142, the tongue 124, and so forth. Further, in some embodiments, the earth grader 100 includes an adjustable stand 204 (e.g., for supporting an end of the earth grader 100 for storage, transport, attachment to a tractor hitch, and so forth).

Referring generally to FIGS. 16 through 20, sod cutters 300 are described in accordance with example embodiments of the present disclosure. In embodiments of the disclosure, the sod cutters 300 can be attached to a vehicle such as a skid steer vehicle (e.g., as shown in FIGS. 19 and 20). However, the sod cutters 300 can also be attached to other types of vehicles, such as a tractor. Further, the sod cutters 300 are configured to be pushed and/or pulled by the vehicle (e.g., pushed by a skid steer vehicle, pushed by a tractor, and/or pulled by a tractor). As described herein, the sod cutters 300 can be used to cut sod in various uneven soil conditions. The sod cutters 300 provide consistent cutting during forward and/or backward motion while automatically following the soil contour. In embodiments of the disclosure, the sod cutters 300 provide automatic pitch and roll adjustment (e.g., using a collapsible flex link and floating tube configuration), which allows the sod cutters 300 to be driven smoothly over vertically and/or horizontally uneven terrain. The sod cutters 300 reduce operational fatigue and maintenance requirements. For example, greaseless pivot points provide ease of maintenance. In some embodiments, visibility for an operator (e.g., from the seat of a skid steer vehicle) can also be improved.

In embodiments of the disclosure, a sod cutter 300 includes a working implement (e.g., a blade 302) having a first end 304 and a second end 306. The blade 302 can be a substantially straight blade, a curved blade, a pointed blade (e.g., a generally 'V'-shaped blade), and so forth. The blade 302 includes a cutting edge 308 configured to separate a strip of grass and soil beneath the strip of grass held together by its roots from the underlying soil, and so forth. In some embodiments, the blade 302 includes serrations disposed along the length of the cutting edge 308. The sod cutter 300 also includes a first support (e.g., a tube 310) for supporting the blade 302. The tube 310 also has a first end 312 and a second end 314. A first arm (e.g., a first blade hanger 316) connects the first end 304 of the blade 302 to the first end 312 of the tube 310, and a second arm (e.g., a second blade hanger 318) connects the second end 306 of the blade 302 to the second end 314 of the tube 310. The first blade hanger 316 and the second blade hanger 318 are pivotally coupled with the tube 310 (e.g., using bolts, screws, etc.). In some embodiments, the angle of the blade 302 with respect to the tube 110 is adjustable (e.g., to accommodate various depths of blade operation and maintain a desired blade penetration angle.

A second support (e.g., a tongue 324) is connected to the tube 310. In some embodiments, the tube 310 is pivotally coupled with the tongue 324 by a torsion coupler (e.g., a torsion mount as shown in FIG. 7). For example, the torsion mount includes a solid torsion bar extending through a tube. The torsion bar is suspended in the tube by elastically deformable members, such as elastic polymeric (e.g., synthetic rubber) cords. In embodiments of the disclosure, the torsion bar is fixedly attached (e.g., integrally formed, welded) to a support configured to connect to a vehicle, while the tube is fixedly attached (e.g., bolted, welded) to another support that connects the tongue 324 to the tube 310. For example, the tube is fixedly attached to a four (4) bolt connector 334 that attaches the tube 310 to the tongue 324. In embodiments of the disclosure, the connector 334 provides a symmetrical bolt hole pattern, allowing the tube 310 to be attached to the tongue 324 in either a push configuration (e.g., as shown in FIG. 17) or a pull configuration (e.g., as shown in FIG. 18). In other embodiments, the sod cutter 300 can include a quick connect. For example, the sod cutter 300 uses eccentric pin locks (e.g., with quarter turn cam lock pins as shown in FIGS. 12 and 13).

In some embodiments, the torsion mount provides between about fifty foot-pounds (50 ft-lbs.) and about two hundred foot-pounds (200 ft-lbs) (e.g., about one hundred and fifty foot-pounds (150 ft-lbs.)) of torsional resistance at about twenty-one degrees (21°) of rotation. However, these values are provided by way of example only and are not meant to limit the present disclosure. In other embodiments, the torsion mount provides less than fifty foot-pounds (50 ft-lbs.) of torsional resistance at about twenty-one degrees (21°) of rotation, more than two hundred foot-pounds (200 ft-lbs) of torsional resistance at about twenty-one degrees (21°) of rotation, and so forth. As described herein, the central torsion tube mounting configuration allows the tube 310 to return to level positioning when not engaged to ground (e.g., for transport). The central torsion tube mounting also provides lubrication-free pivotal engagement for increased life and/or reduced maintenance of the sod cutter 300. In some embodiments, the sod cutter 300 includes one or more replaceable wear blocks for the central torsion components to provide positive, high durability, push and pull contact surfaces (e.g., as shown in FIG. 2). In some embodiments, the wear blocks are fabricated from ultra-high-molecular-weight polyethylene (UHMWPE).

In embodiments of the disclosure, a third support (e.g., a connecting support 342) is connected to the tube 310 and/or the tongue 324. The connecting support 342 is configured to attach to a vehicle, such as a skid steer vehicle, a tractor, and so forth. For example, the connecting support 342 comprises a skid steer mounting connector for attaching to a skid steer vehicle (e.g., as shown in FIGS. 16, 19, and 20), a three-point attachment (hitch, linkage) for attaching to a tractor (e.g., as shown in FIGS. 17 and 18), and so forth. The tube 310 and/or the tongue 324 are configured to extend from the connecting support 342 generally horizontally in a working orientation (e.g., as shown in FIGS. 19 and 20). For example, the tongue 324 is connected to the connecting support 342 by a four (4) bolt joint 344 (e.g., allowing the tongue 324 to be connected to different hitch types). In some embodiments, the tube 310 and/or the tongue 324 are configured to articulate with respect to the connecting support 342 between the working orientation and a transport orientation, where the tube 310 and/or the tongue 324 are angled away from the generally horizontal working orientation. Further, the articulation between the tube 310 and/or the tongue 324 and the connecting support 342 allows the tube 310 to move in a vertical manner over the contours of the terrain. In this manner, the tube 310 can move somewhat independently of the vehicle, allowing the sod cutter 300 to flow over uneven terrain.

In some embodiments, the sod cutter 300 includes a collapsible flex link 346. The flex link 346 can be configured to prevent the tube 310 and/or the tongue 324 from hyper-extending with respect to the connecting support 342 (e.g., restricting flex of the sod cutter 300 to one direction in a working orientation). In one example, the flex link 346 can include three (3) pivot points, and two rigid portions, which can be maintained at a relative angle to one another so that flex link 346 cannot be completely straightened (e.g., the rigid portions of the flex link 346 are maintained at an angle of less than one hundred and eighty degrees (180°) with respect to one another). In this manner, the flex link 346 allows the sod cutter 300 to be carried in a transport orientation, floated in a working orientation, lifted into a trailer transport orientation, and/or locked in a rigid, non-collapsed position. The sod cutter 300 can be locked into various fixed positions (e.g., the floating working orientation shown in FIG. 19 and/or the fixed working orientation shown in FIG. 20). In some embodiments, a ball lock pin 348 is used to lock the tube 310 and/or the tongue 324 into a particular orientation with respect to the connecting support 342.

In embodiments of the disclosure, the sod cutter 300 includes one or more adjustable gauge wheels 360 and/or 362 for controlling the height of the tube 310 with respect to the ground during operation of the sod cutter 300. For example, a gauge wheel 360 and/or 362 is attached to the tube 310 by forks 364 and 366 on either side of the gauge wheel 360 and/or 362. The forks 364 and 366 are pivotally connected (e.g., bolted) to gussets 368 and 370, respectively, at the bottoms of the forks 364 and 366. The gussets 368 and 370 are fixedly attached (e.g., bolted, welded) to the tube 310. At the top of the forks 364 and 366, a sleeve 372 is pivotally connected (e.g., bolted) to the forks 364 and 366. The sleeve 372 is fixedly attached (e.g., integrally formed, welded) to a handle 374. The handle 374 includes a roll pin 376 that interfaces with a comb 380 fixedly attached (e.g., bolted, welded) to the tube 310.

The roll pin 376 is used as a guide when adjusting the height of the gauge wheel 360 and/or 362 by interfacing with slots on the comb 380. For example, after adjusting the gauge wheel 360 and/or 362 to a desired height, the gauge wheel 360 and/or 362 is locked in place with a pull pin 382 placed into an aligned hole associated with the desired comb slot. In this manner, the gauge wheel 360 and or 362 allows the tube 310 to be set to a desired height above the soil. In some embodiments, the gauge wheel 360 and/or 362 is adjustable at about one-half inch (½ in.) intervals up to about two and one-half inches (2½ in.). However, it should be noted that these values are provided by way of example only and are not meant to limit the present disclosure. In other embodiments, the gauge wheel can be adjusted at different intervals up to more or less than about two and one-half inches (2½ in.). The height of the blade 302 can be adjusted using the gauge wheels 360 and 362. In some embodiments, the gauge wheels 360 and 362 include spikes (e.g., studs 384). Further, the sod cutter 300 can include one or more scrapers 386 associated with a gauge wheel to remove soil from the wheel. It should be noted that while the gauge wheels 360 and 362 are shown on one side of the tube 310 in the embodiments illustrated in the accompanying figures, gauge wheels can also be included on the other side of the tube 310, on both sides of the tube 310, and/or at different locations with respect to the tube 310.

In some embodiments, the sod cutter 300 includes one or more steps 402 (e.g., for the convenience of an operator entering or exiting a skid steer vehicle). For example, the steps 402 are fixedly attached (e.g., bolted, welded) to the connecting support 342, the tongue 324, and so forth. Further, in some embodiments, the sod cutter 300 includes an adjustable stand 404 (e.g., for supporting an end of the sod cutter 300 for storage, transport, attachment to a tractor hitch, and so forth).

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An earth working apparatus comprising:
a blade having a first end and a second end;
a support for supporting the blade, the support having a first end and a second end;
a first arm connecting the first end of the blade to the first end of the support;
a second arm connecting the second end of the blade to the second end of the support;
a tongue connected to the support;
a torsion coupler pivotally coupling the support with the tongue;
a connecting support connected to the tongue by a collapsible flex link, the connecting support configured to attach to a vehicle, the tongue configured to extend from the connecting support generally horizontally in a working orientation, wherein the tongue is configured to articulate with respect to the connecting support between the working orientation and a transport orientation where the tongue is angled away from the generally horizontal working orientation; and
a visual sight gauge including a rod extending through a sleeve, the rod including a first end connected proximal to the support and a second end extending through the sleeve connected distal the support to a portion of the collapsible flex link, the rod including a mark on a surface of the rod, wherein a position of the mark relative to the sleeve corresponds to a working angle of the support relative to a ground surface.

2. The earth working apparatus as recited in claim 1, further comprising an adjustable gauge wheel pivotally connected to the support and a handle for adjusting the adjustable gauge wheel.

3. The earth working apparatus as recited in claim 2, wherein the support comprises a comb, and the handle comprises a roll pin configured to interface with the comb to facilitate adjustment of the adjustable gauge wheel.

* * * * *